United States Patent
Raghu et al.

(10) Patent No.: US 8,633,913 B1
(45) Date of Patent: Jan. 21, 2014

(54) TOUCH INTERFACES AND CONTROLS FOR AVIATION DISPLAYS

(71) Applicants: Kaushik Raghu, Cedar Rapids, IA (US); Ivan N. Hall, III, Iowa City, IA (US); Bruce D. Hufnagel, Marion, IA (US); Matthew J. Carrico, Mount Vernon, IA (US)

(72) Inventors: Kaushik Raghu, Cedar Rapids, IA (US); Ivan N. Hall, III, Iowa City, IA (US); Bruce D. Hufnagel, Marion, IA (US); Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/743,182

(22) Filed: Jan. 16, 2013

Related U.S. Application Data

(63) Continuation-in-part of application No. 13/224,992, filed on Sep. 2, 2011.

(51) Int. Cl.
*G06F 3/041* (2006.01)

(52) U.S. Cl.
USPC .................................. 345/173; 340/945

(58) Field of Classification Search
USPC ............... 345/173–179; 178/18.01; 200/512; 340/407.1, 951; 342/33; 701/16
See application file for complete search history.

(56) References Cited

U.S. PATENT DOCUMENTS

| | | |
|---|---|---|
| 6,441,773 B1 | 8/2002 | Kelly et al. |
| 6,448,922 B1 | 9/2002 | Kelly |
| 6,650,275 B1 | 11/2003 | Kelly et al. |
| 6,977,608 B1 | 12/2005 | Anderson et al. |
| 7,109,912 B1 | 9/2006 | Paramore et al. |
| 7,109,913 B1 | 9/2006 | Paramore et al. |
| 7,161,525 B1 | 1/2007 | Finley et al. |
| 7,242,343 B1 | 7/2007 | Woodell |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,372,394 B1 | 5/2008 | Woodell et al. |
| 7,379,014 B1 | 5/2008 | Woodell et al. |
| 7,417,578 B1 | 8/2008 | Woodell et al. |
| 7,417,579 B1 | 8/2008 | Woodell |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,765 B1 | 5/2009 | Woodell et al. |
| 7,541,970 B1 | 6/2009 | Godfrey et al. |
| 7,541,971 B1 | 6/2009 | Woodell et al. |
| 7,557,735 B1 | 7/2009 | Woodell et al. |
| 7,576,680 B1 | 8/2009 | Woodell |

(Continued)

OTHER PUBLICATIONS

U.S. Appl. No. 13/224,992, filed Sep. 2, 2011, Hufnagel et al.

(Continued)

*Primary Examiner* — Kevin M Nguyen
*Assistant Examiner* — Kenneth B Lee, Jr.
(74) *Attorney, Agent, or Firm* — Donna P. Suchy; Daniel M. Barbieri

(57) ABSTRACT

An apparatus for controlling an aviation display is provided. The apparatus includes processing electronics configured to cause a first representation of aviation data to be shown in a first format and to cause, in response to a user input relative to the first format, a second representation of the aviation data to be shown in a second format, in a predefined location on a region of an aircraft display.

21 Claims, 18 Drawing Sheets

(56) References Cited

U.S. PATENT DOCUMENTS

| | | |
|---|---|---|
| 7,633,428 B1 | 12/2009 | McCusker et al. |
| 7,633,430 B1 | 12/2009 | Wichgers et al. |
| 7,693,621 B1 * | 4/2010 | Chamas .................... 701/16 |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,859,448 B1 | 12/2010 | Woodell et al. |
| 7,859,449 B1 | 12/2010 | Woodell et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,965,225 B1 | 6/2011 | Dickerson et al. |
| 8,072,368 B1 | 12/2011 | Woodell |
| 8,077,078 B1 | 12/2011 | Woodell et al. |
| 8,159,464 B1 | 4/2012 | Gribble et al. |
| 2006/0244636 A1 | 11/2006 | Rye et al. |
| 2007/0279253 A1 | 12/2007 | Priest |

OTHER PUBLICATIONS

U.S. Appl. No. 13/250,307, filed Sep. 30, 2011, Jinkins.
U.S. Appl. No. 13/250,798, filed Sep. 30, 2011, Jinkins.
G2000, Garmin, printed from website https://buy.garmin.com/shop/shop.do?cID=153&pID=97668 on Jun. 28, 2011, 2 pages.
G3000, Garmin, printed from webiste https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.`
Office Action for U.S. Application No. 13/224,992, mail date Feb. 28, 2013, 10 pp.

* cited by examiner

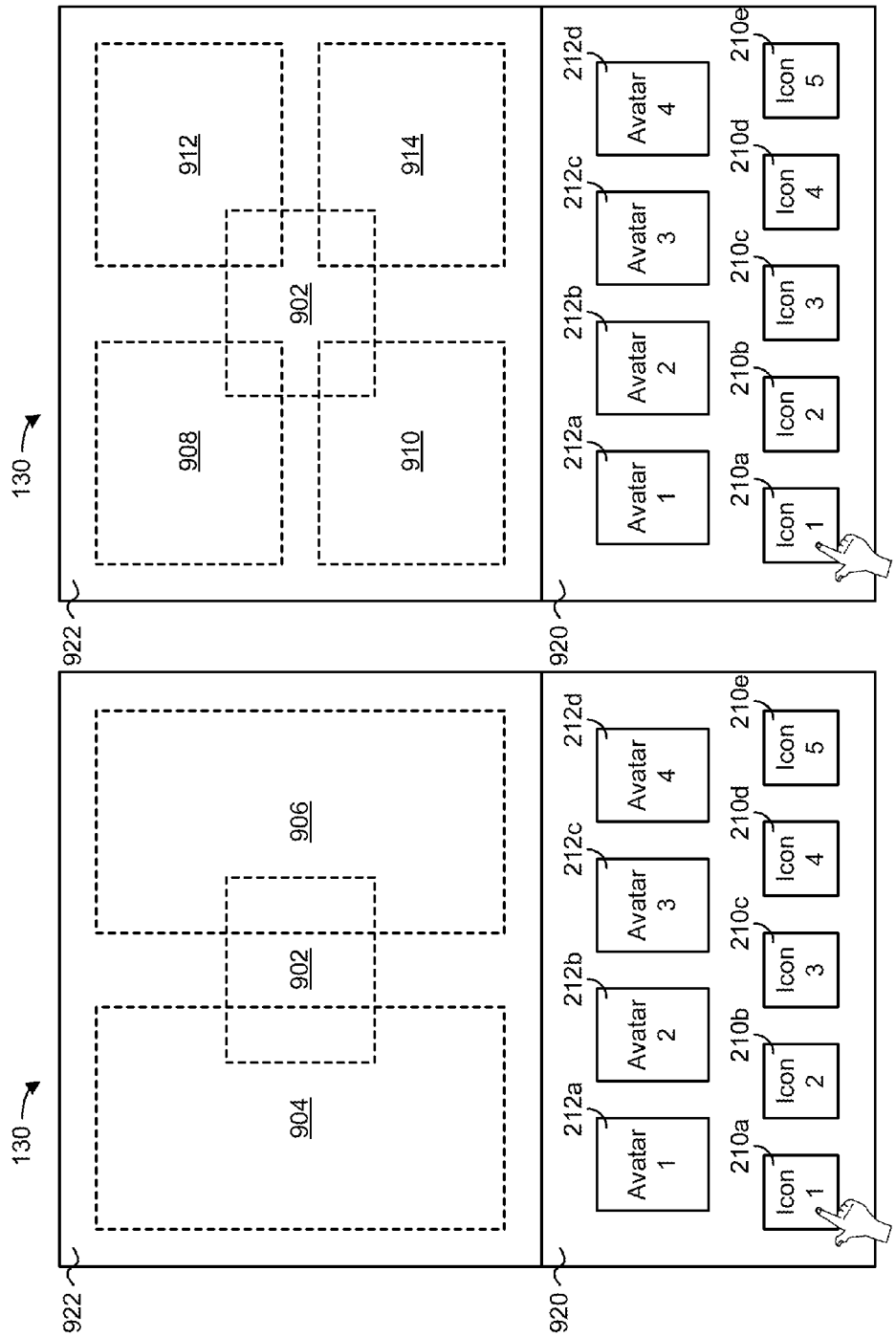

TOUCH INTERFACES AND CONTROLS FOR AVIATION DISPLAYS

CROSS-REFERENCE TO RELATED PATENT APPLICATIONS

This application is a Continuation-In-Part of U.S. application Ser. No. 13/224,992, entitled "Touch Interfaces and Controls for Aviation Displays," filed Sep. 2, 2011, incorporated herein by reference in its entirety.

BACKGROUND

The present disclosure relates generally to the field of aviation display systems. The present disclosure more specifically relates to the field controlling an aviation display.

As technology improves, aviation displays are becoming more interactive. Interaction with aviation displays typically includes controlling a cursor through the use of buttons and/or knobs. Buttons, knobs, and the accompanying control panels consume valuable real estate on a crowded flight deck. Furthermore, cursor interaction with the displayed information is an indirect interaction with the displayed information. That is, the user performs a tracking exercise to move the cursor to the desired information as opposed to directly interacting with the information displayed. Typical current aviation display systems have limited ability to rapidly customize information displayed according to the task at hand, which restricts a user's ability to process the large quantities of real-time data provided by state of the art avionics systems. There exists a need for improved aviation display controls systems.

SUMMARY

One embodiment relates to an apparatus for controlling an aviation display. The apparatus includes processing electronics configured to cause a first representation of a first aviation data to be shown in a first forma. The processing electronics are further configured to cause, in response to a first user input relative to the first format, a second representation of the first aviation data to be shown in a second format. The second format may include a first predefined location on a first region of a display.

Another embodiment relates to an apparatus for controlling an aviation display. The apparatus includes processing electronics configured to cause a representation of a first aviation data to be shown in a first region of a display and a second aviation data to be shown in a second region of the display. The processing electronics may further be configured to cause, in response to receiving a first user input from a touchscreen, the representation of the first aviation data to switch regions with the representation of the second aviation data.

Another embodiment relates to an apparatus for controlling an aviation display. The apparatus includes processing electronics configured to receive a first user selection of a first representation of a first aviation data and a second user selection of a first representation of a second aviation data. The processing electronics may further be configured to cause, in response to receiving the first user selection and the second user selection, a second representation of the first aviation data to be shown in a first predefined location of a display and a second representation of the second aviation data to be shown in a second predefined location of the display.

BRIEF DESCRIPTION OF THE DRAWINGS

FIG. 9A is a schematic illustration of an aviation display interface, according to another exemplary embodiment.

FIG. 9B is a schematic illustration of an aviation display interface, according to another exemplary embodiment.

DETAILED DESCRIPTION

Figure 1:
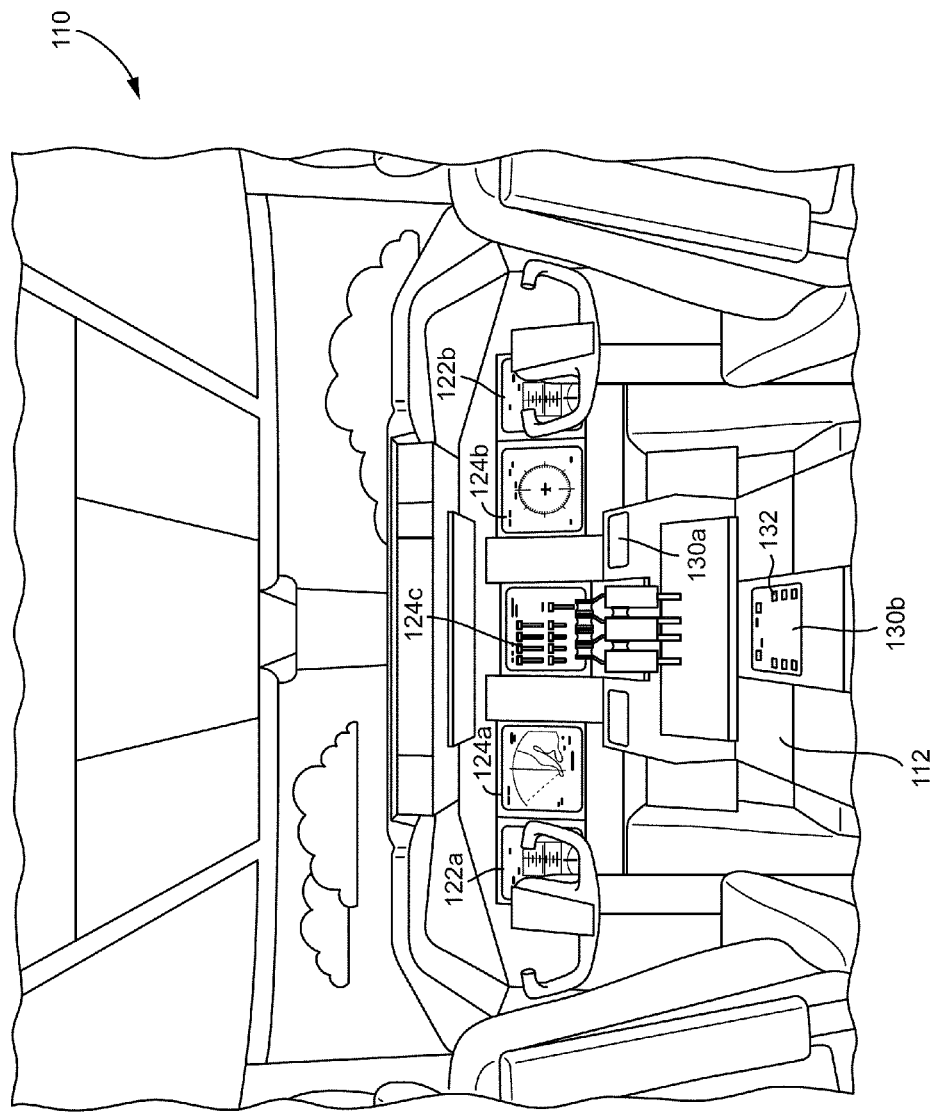
FIG. 1 is a perspective view schematic illustration of an aircraft control center, according to an exemplary embodiment.

Referring generally to the Figures, an apparatus and methods for controlling an aviation display are described. In a modern aircraft control center (i.e., flight deck or cockpit), large quantities of information are provided from avionics system to the pilot or copilot. Most of this information is provided through forward displays which are readily in view of the pilot and copilot when facing forward. The primary flight displays (PFDs) are usually located directly in front of the pilot or copilot and provides primary flight information, such as, altitude, airspeed, and heading. The multi-function displays (MFDs) are typically located to one side or another of the PFD and typically provide navigation, weather, and system information. This information is usually provided in a standard, certified format.

Under normal flight conditions, providing information in the standard orientation and arrangement of gauges may be sufficient. However, it is often desirable to rearrange or manipulate the presentation of data according to the task at hand. Furthermore, it may be desirable to quickly view real-time or live data, but without requiring the presentation of such data to occupy a large portion of the display. For example, it may be desirable to have real-time topographical maps or charts available, but due to conditions, weather radar occupies most of the forward display. Similarly, it may be desirable to monitor real-time diagnostic information (e.g., engine temperature, oil pressure, etc.), but not desirable to displace the information displayed on the PFD or MFD. Accordingly, an aviation display control system is described which allows a user to switch between a full-format image (e.g., the certified format displayed on a PFD, MFD, electronic flight bag (EFB), head-up display (HUD, including windscreen projected displays, helmet-mounted displays, etc.), etc.) of live data and a scaled-representation (e.g., miniaturized version, enlarged version, subset of information, etc.) of the live data. According to various embodiments, the user may then interact with and manipulate the scaled-representation of the live data. According to other embodiments, the user may switch between full-format images of live data or scaled-representations of the live data and an icon symbolic of live data.

The current state of the art flight deck user interface is typically based on direct controls and cursor control devices. This type of user interface dissociates the information being manipulated on the screen from the physical control action used to activate a button or move the cursor. That is, using a cursor becomes a tracking exercise and may distract the user from the task at hand. Providing a touchscreen as part of the human machine interface enables a user to directly interact with the information being manipulated, which reduces workload, reduces training, and enhances safety. According to various embodiments, touchscreen gestures may enable a user to interact with icons, avatars (e.g., scaled-representations of live data), or full-format images of live data. According to other embodiments, touchscreen gestures enable the user to move representations of live data between screens in the aircraft control center.

An avatar is a scaled representation of the actual format and screen. Avatars presented on a touch display can represent several PFD, MFD, EFB, and head-up display formats. For example, an avatar may display primary flight display, Synthetic Vision System, topographical map, chart, airport map, Integrated Control Display Unit, radio tuning, Engine Indicating and Crew Alert System, checklist, and synoptics information. Avatars can display scaled versions of their representative formats real-time, or live. The real-time, or live, data may have a delay or latency depending on the particular system and the refresh rate of data received; however, the data is live in the sense that is being updated whenever new data is received. Content on the PFDs, MFDs, and EFBs can be chosen from a variety of avatars on the touch interface displays by flicking or dragging them into slots representing the flight deck's actual display layout. One avatar may be dragged over another to replace it and automatically displace the previous avatar back into a selection area. One avatar may be dragged over another to add information to the underlying display, for example, adding a weather overlay to a chart.

Avatars are different from icons in that avatars represent live, scaled-down information, whereas icons are a symbolic representation of the live data. Avatars and icons may swap status. That is, an avatar may become an icon, and an icon may become an avatar. Icons and avatars may have various sizes depending on screen size and resolution, and may be adjusted in size to compensate for distance from the viewer or the viewer's visual acuity. Avatars are typically larger in size than icons and smaller than full format images. For example, according to various embodiments, icons may have dimensions of 32 pixels×32 pixels, 48 pixels×48 pixels, 6 mm×9 mm, 13 mm×13 mm, etc. According to other embodiments, avatars may have dimensions of 64 pixels×128 pixels, 192 pixels×96 pixels; 128 pixels×256 pixels; 256 pixels×256 pixels, 40 mm×55 mm, 75 mm×50 mm, 75 mm×100 mm, etc. It is contemplated that an avatar may be scaled down to the size of an icon, scaled up to the size of a full format image on a forward display, or scaled to any size in between. Depending on screen size and resolution, an avatar may be scaled larger than the full format image on the forward display. It is further contemplated that an avatar may be scaled to a size smaller than an icon.

Any format may be selected for manipulation in the touch display interface, including formats currently on display in any of the other flight deck displays. The format desired for manipulation can expand from icon or avatar status to fill most of the touch display screen for manipulation of the content. Pinch and stretch actions can zoom on certain portions of any particular format. Once zoomed in, a drag operation can be performed to pan across the format or image. Formats may consist of interactive objects that can be selected for direct manipulation. Objects can be identified visually by a halo or other indicator. Interaction with formats or various objects can be echoed on another display, such as an MFD, to aid in interaction without requiring the crew to focus all attention upon the touch display. The echo may not only include actions on the format or object, but a representation of the crew's finger input location, thereby effectively producing a cursor identifiable as a touch input. The echo may be selectively placed on any forward display. For example, a copilot may place and manipulate relevant information on the captain's forward display.

It should be noted, that the interfaces described herein may be used to monitor and/or control aircraft systems. For example, the described interface may be used to view and interact with information relating to weather radar, synoptics, checklists, the electrical system, the hydraulic system, and other avionics and/or on-board systems. For further example, the interface may be used to control the radio, cabin pressure, the radar, the hydraulic system, the electrical system, etc. According to one embodiment, a touchscreen may be used to control on-board systems beyond the display being touched.

As used herein, aircraft control center, flight deck, cockpit, aircraft systems, and aviation display are applicable to actual aircraft as well as flight simulators. EFBs include, among other things, portable electronic devices and commercial off-the-shelf equipment, such as laptop computers and handheld electronic devices including tablet computers (e.g., iOS, Android, Windows, and Linux based tablets, Apple iPad, etc.), smartphones, etc. EFBs may be secured or unsecured on the flight deck, and may be wired or wirelessly connected to the aircraft or flight simulator processing electronics. Other displays (e.g., helmet-mounted displays) may also be wired or wirelessly connected to the aircraft or simulator processing electronics. The displays may be configured to provide two-dimensional (2D) or three-dimensional (3D) images.

Referring to FIG. 1, an illustration of an aircraft control center or cockpit or flight deck 110 is shown, according to an exemplary embodiment. Aircraft control center 110 is shown to include a central pedestal 112, one or more touchscreens 130, and a plurality of flight deck displays. The flight deck displays include one or more forward displays, shown as primary flight displays (PFD) 122 and multi-function displays (MFD) 124. First and second PFDs, shown as left PFD 122a and right PFD 122b, are typically located directly in front of the pilot and copilot and display primary flight information, for example, airspeed, altitude, altitude, heading, vertical speed, and turn coordination. First and second MFDs, shown as left MFD 124a and right MFD 124b, are typically located to one side or another of the PFD and provide navigation, weather, and system information. An MFD may be displayed on a single display along with PFD information, or the MFD may be a separate display adjacent to a PFD or on the central pedestal 112, for example central MFD 124c.

Touchscreen 130 includes a touch sensitive surface and a display. The touch sensitive surface may be integrated into the display as an overlay or bezel, for example. Touchscreens may be implemented on forward displays, a central pedestal display (shown as first central pedestal display 130a and second central pedestal display 130b), a small tray table display, an EFB (e.g., mobile device, laptop computer, tablet computer, smartphone, etc.) or any multipurpose display in the flight deck 110 or cabin that can accommodate a touchscreen. In some aircraft, for example in business and regional services aircraft and other small aircraft, PFD 122 and MFD 124 may be easily reachable by a pilot or copilot. Accordingly, PFD 122 and/or MFD 124 may be touchscreens which can be directly interacted with by the crew. The central pedestal display 130 provides the benefit of preventing the crew from smudging the PFDs 122 or MFDs 124 with fingerprints, and the touch interface is conveniently located within reach during adverse conditions. The tray table display (not shown) may be a small display or folded multiple displays disposed on a tray table in an outboard armrest or a pocket under the side window. Using a tray table display prevents smudging of the forward displays and keeps the touch interface within easy reach without interfering with any flight operations or other controls. For example, the tray table may be positioned across a user's lap. Touchscreen 130 provides signal output to the aviation display control system. Any single or multi-touch technology will support the concepts described herein; however, some user interface techniques may require a multi-touch screen.

Conventional user interface methods, for example, cursor control devices 132 (e.g., buttons, switches, knobs, dials, etc.) or other direct controls, may be retained for use as an alternative to the touch interface in the event no hands are free or the operating environment does not allow for fine motor control. For example, cursor control devices 132, may be used in turbulence, other conditions when the touchscreen is less effective, or as a backup user interface control in event of a loss of the touchscreen. Likewise, touchscreen 130 may also act as a cursor control device in benign environments. According to one embodiment, a bezel button or a larger switch can reassign the display format layout to an approved standard, thereby instantly reverting all formats to a default condition and layout. The switch should be easy to reach and use during adverse conditions but not able to be accidentally actuated when using the touch display. A large button with high activation force might be considered.

Figure 2A:
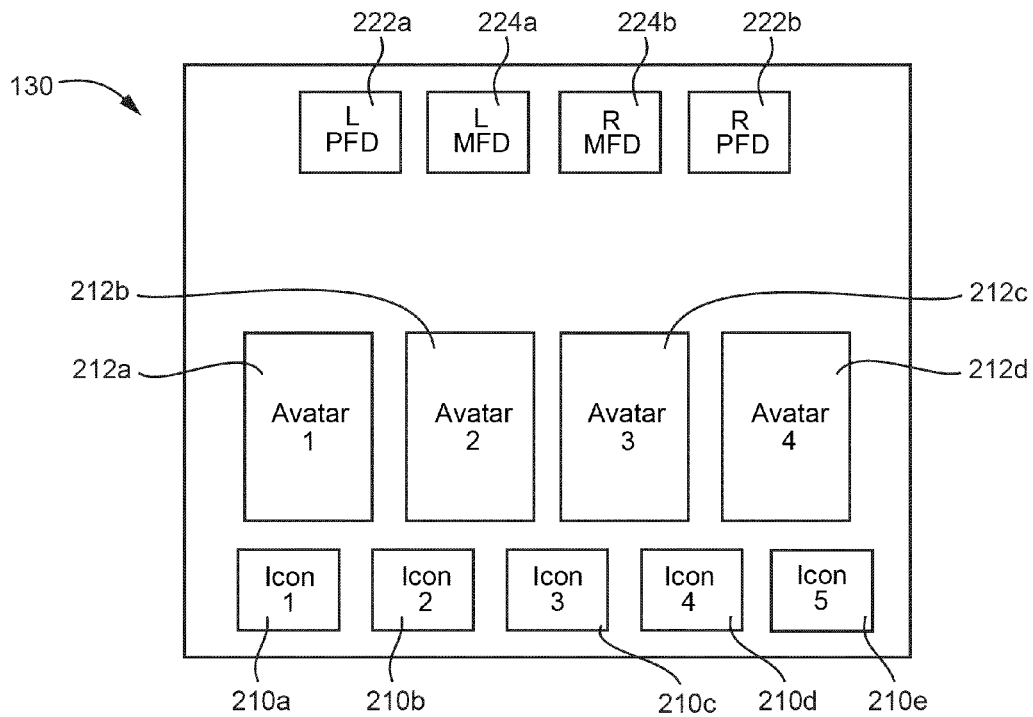
FIG. 2A is a schematic illustration of an aviation display interface, according to an exemplary embodiment.
Figure 2B:
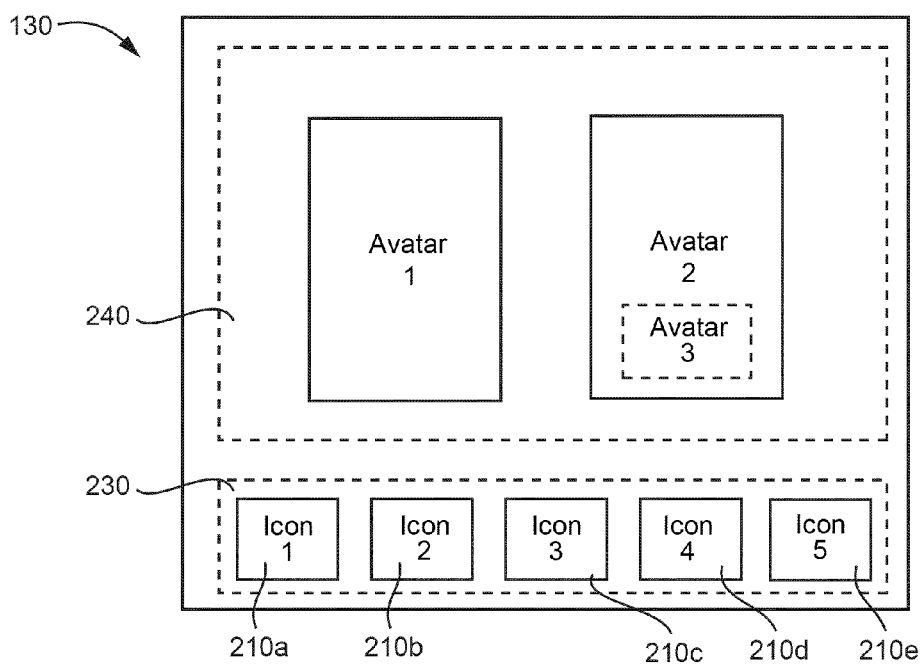
FIG. 2B is a schematic illustration of an aviation display interface, according to another exemplary embodiment.
Figure 2C:
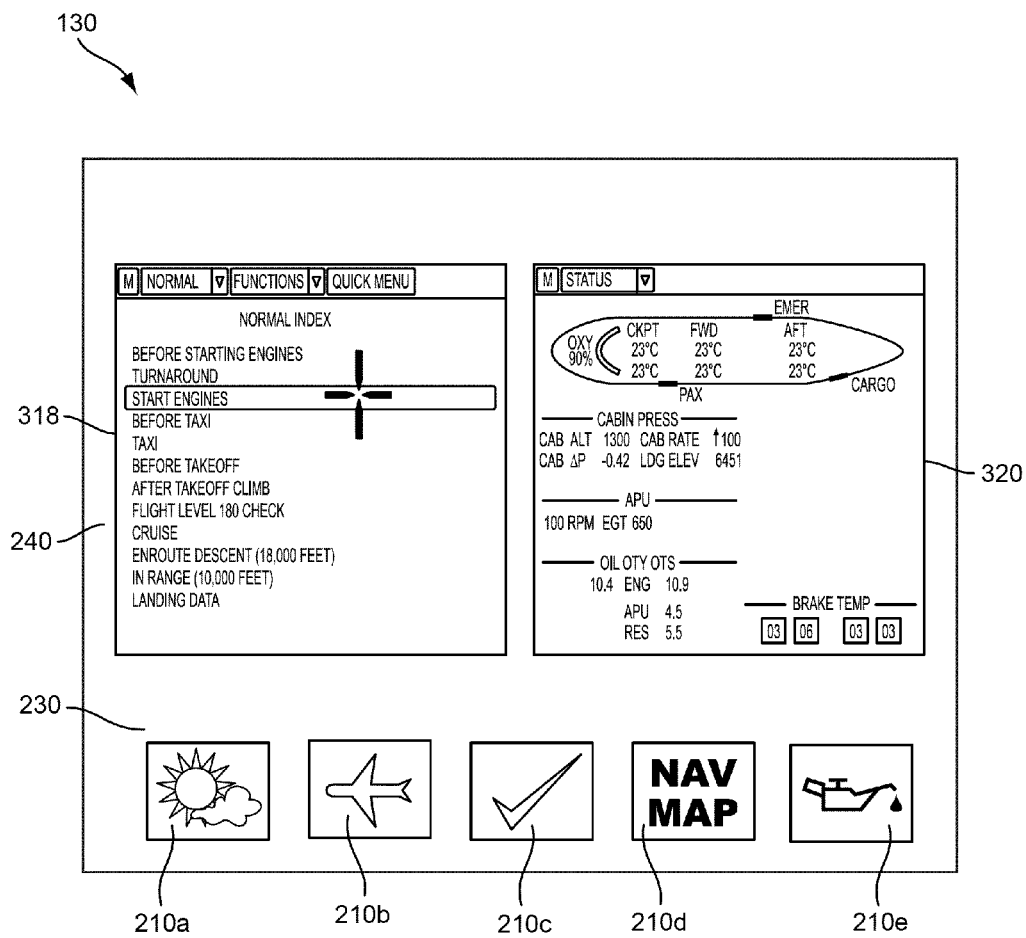
FIG. 2C is an illustration of the aviation display interface of FIG. 2B, according to an exemplary embodiment.

Referring to FIGS. 2A-C, illustrations of aviation display interfaces are shown, according to exemplary embodiments. Specifically, FIGS. 2A-B schematically illustrate the interface shown on touchscreen 130, according to various embodiments. As shown in FIG. 2A, touchscreen 130 includes one or more locations (e.g., areas, portions, positions, slots, etc.), shown as icon locations 210, avatar locations 212, and forward display locations. The forward display locations represent or correspond to PFDs 122 and MFDs 124, e.g., left PFD display location 222a corresponds to left PFD 122a, left MFD location 224a corresponds to left MFD 124a, right MFD location 224b corresponds to right MFD 124b, and right PFD location 222b corresponds to right PFD 122b. As shown, the forward display locations are oriented respective to each other as the forward displays are oriented respective to each other on flight deck 110. According to the embodiment shown in FIG. 2B, touchscreen 130 may not include PFD locations 222 or MFD locations 224 and may include an icon region 230 and an avatar region 240.

The icon locations 210, e.g., icon location 210a, icon location 210b, etc., and icon region 230 are configured to display icons. Icons are a symbolic representation of the aviation data. The symbolic representation may be a memorable symbol that allows a user to associate in information with the icon, but does not necessarily mimic the full format information. For example, a sun disk or sun-and-cloud symbol may be used to represent weather information. According to another example, a silhouette of an aircraft may represent system information (e.g., mechanical, electrical, or hydraulic system information). According to one embodiment, icons may flash, change shape, and/or change color in response to changing information. For example, the silhouette of an aircraft icon may become a flashing red thermometer in response to an engine overheating.

Figure 3A:
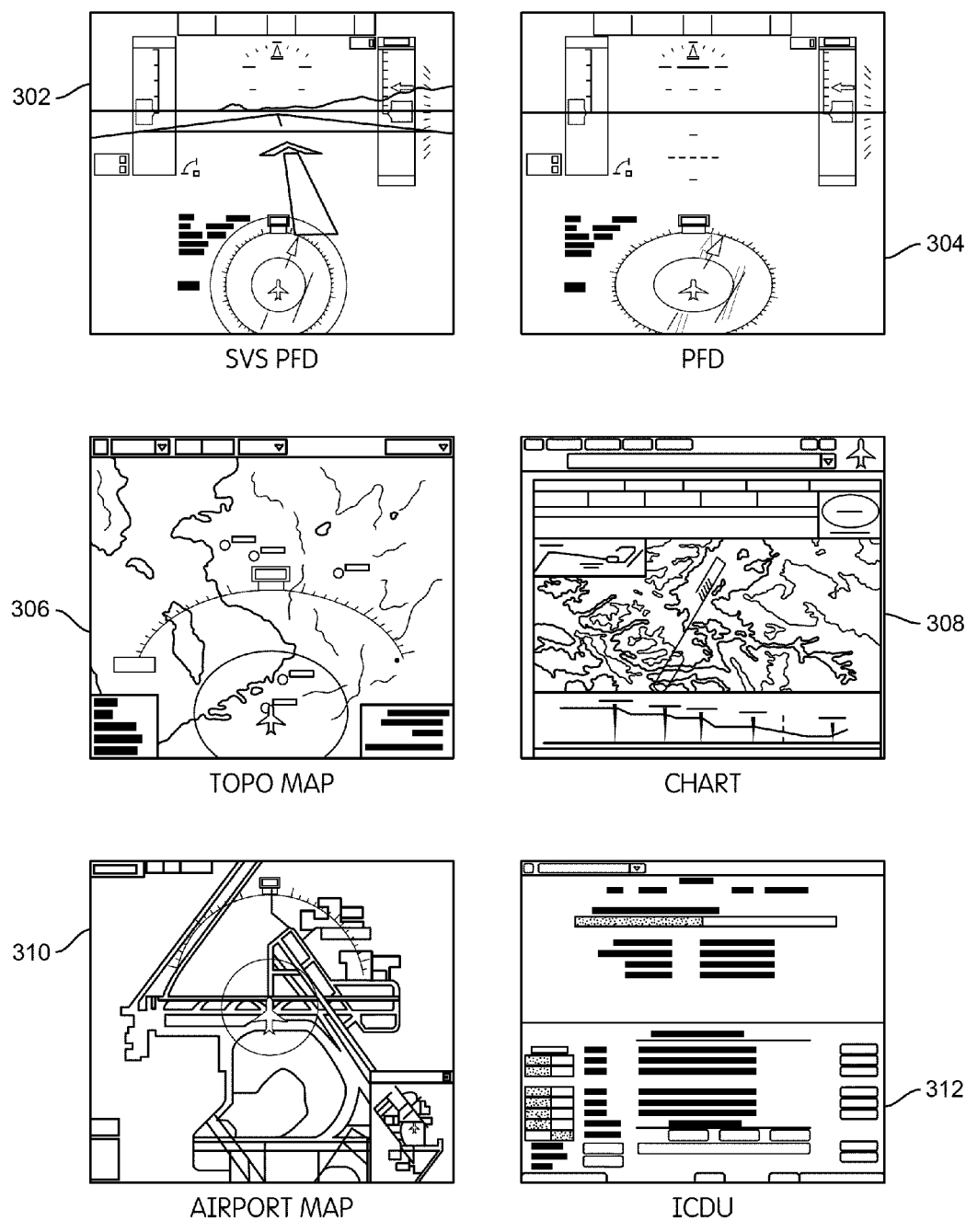
FIG. 3A is an illustration of sample avatars, according to an exemplary embodiment.
Figure 3B:
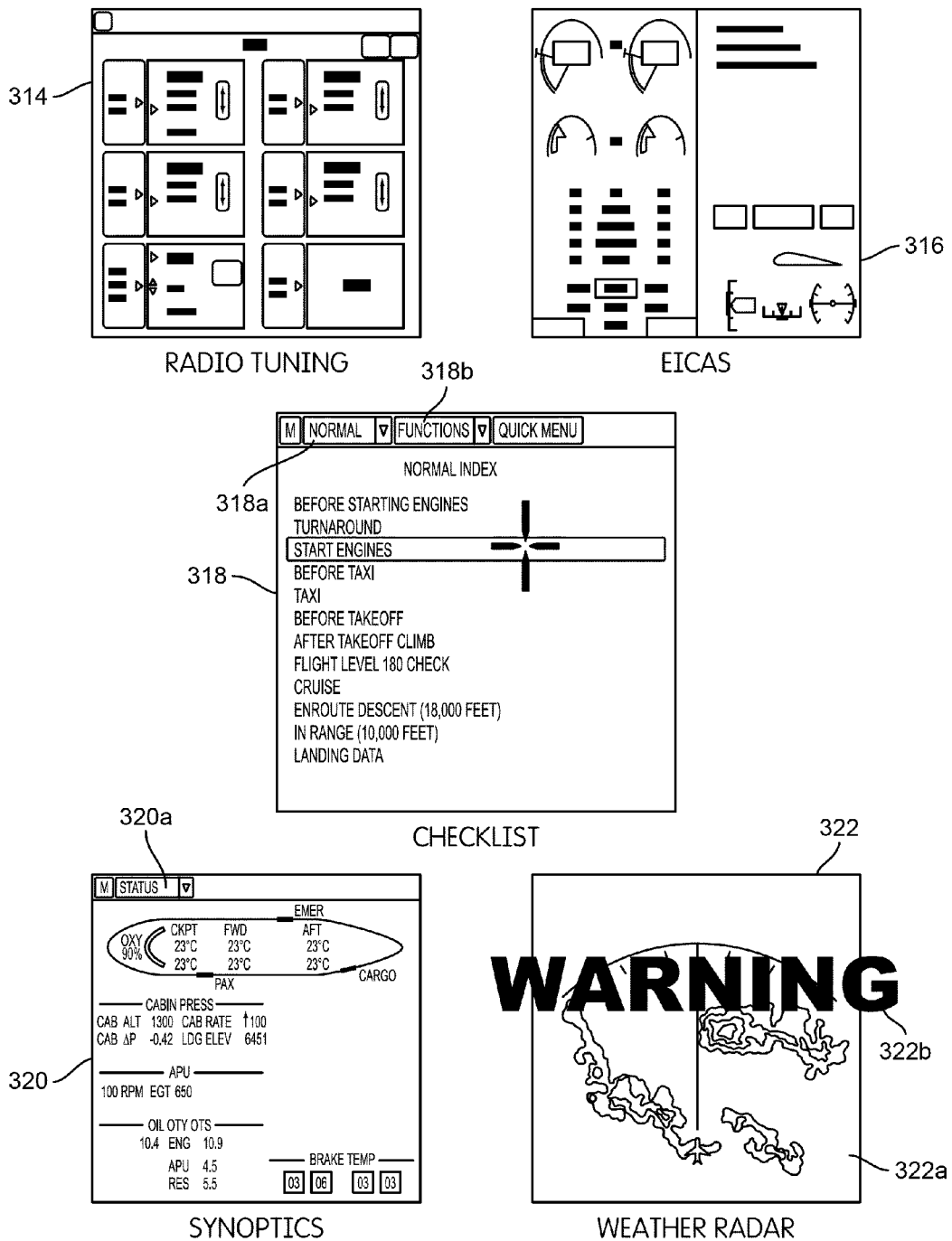
FIG. 3B is another illustration of sample avatars, according to an exemplary embodiment.

Avatar locations 212, e.g., avatar location 212a, avatar location 212b, etc., and avatar region 240 are configured to display avatars. Referring to FIGS. 3A-B, a plurality of avatars are shown according to exemplary embodiments. Avatars are a scaled representation of the actual formats and screens (e.g., the certified format displayed on a PFD 122, MFD 124, or EFB). For example, an avatar may display Synthetic Vision System (SVS) 302, primary flight display 304, topographical map 306, chart 308, airport map 310, Integrated Control Display Unit (ICDU) 312, radio tuning 314, Engine Indicating and Crew Alert System (EICAS) 316, checklist 318, synoptics information 320, and weather radar 322. Avatars can display scaled versions of their representative formats in real-time, or live. Avatars 302-322 are shown with titles for clarity; however, in use, avatars 302-322 may or may not include titles. Avatars 302-322 are further shown with black lines which indicate text, which may or may not be legible based on the scaling of the avatar.

According to one embodiment, the full format representation may include layers which the avatar may scale different rates. For example, referring to weather map avatar 322, a weather information layer 322a may scale down at a first rate; however, a weather warning layer 322b may scale at a second rate, remaining larger in order to attract attention. According to another embodiment, the avatar may display a subset of information, for example, a checklist may contain a plurality of details on the forward flight display; however, checklist avatar 318 may only contain headings or less detailed information in avatar format. The checklist may still be updated in real time, for example, headings may change color in response to portions of the checklist been completed. According to another embodiment, a synoptic avatar 320 may display prominent green flag 320a of all systems are fine, but a yellow or red flag indicative of a status message, for example, it the cabin pressure or temperature nears or exceeds operating limits, respectively.

Avatars may be interacted with via touchscreen 130 or cursor control devices 132. As shown, checklist avatar 318 shows user interaction via a cursor control device. Alternatively, the desired heading may be selected by a touchscreen gesture, e.g., tapping or double-tapping. According to another embodiment, touchscreen interaction with the display system may include actuating pulldown menus (e.g., pulldown menus 318a and 318b in checklist avatar 318) via finger in lieu of a cursor. In one embodiment, providing a gesture in relation to an avatar may cause the avatar to fill the entire display. In response other avatars may fade into the background, may be overridden, may be reduced in size to a portion of the display, or converted into icons.

Returning to the embodiment shown in FIG. 2A, dragging an icon or an avatar onto a forward display location causes the information represented by the icon or avatar to be displayed on the respective forward display, e.g., PFD location 222a or 222b or an MFD location 224a or 224b. Similarly, dragging from a PFD location 222, MFD location 224, or avatar location 212 to an icon location 210 causes the live information displayed on the forward display or as an avatar to become symbolically represented as an icon located in the selected icon location 210. Dragging from an icon location 210 to an avatar location 212 causes the information symbolically represented by the icon to become scaled representation of the live data displayed in the selected avatar location. According to various embodiments, dragging from PFD location 222 or MFD location 224 to avatar location 212 may cause the full format image on the forward display to become an avatar located in avatar location 212 or to simultaneously display (e.g., echo) the live information both on PFD 122 or MFD 124 and in avatar location 212.

According to alternate embodiments, gestures other than dragging may be performed on the icons, avatars, icons locations 210, and avatar locations 212, for example tapping, flicking, stretching, etc. For example, tapping, double tapping, or flicking an avatar or avatar location 212 may cause the live information represented by the avatar to be displayed as a full format on a forward display. According to other embodiments, the avatar or icon are not displayed in the selected location (e.g., drag-to location), but are instead displayed in the next available location. For example, if an icon is dragged to an occupied avatar location 212a, the live data is displayed as an avatar in avatar location 212b. Similarly, if icon location 210a is occupied, the generated icon may be displayed in icon location 210b, etc.

According to the embodiment shown in FIG. 2B, touchscreen 130 may not include PFD location 222 or MFD locations 224. For example, according to the embodiment shown in FIG. 2B, touchscreen 130 includes an icon region 230 and an avatar region 240. Dragging an avatar from avatar region 240 into icon region 230 may convert the selected avatar into an icon, i.e., convert the presentation of information from a scaled live representation to a symbolic representation, and place the icon in the next available icon location 210. Similarly, dragging an icon from icon region 230 to avatar region 240 may convert the icon into an avatar, causing the information symbolically represented by the icon to be displayed as scaled live data in avatar region 240. Performing a gesture on an icon located in icon region 230 may cause the live data represented by the icon to be displayed on PFD 122 or MFD 124. According to one embodiment, flicking an icon in a particular direction or towards the desired PFD 122 or MFD 124 causes the symbolically represented information to be displayed as live information on PFD 122 or MFD 124. According to another embodiment, dragging an icon from icon region 230 to an edge of touchscreen 130 causes the live information symbolically represented by the icon to be displayed on PFD 122 or MFD 124.

According to one embodiment, avatars in avatar region 240 may change size and location in response to a user input. For example, a pinching gesture may cause an avatar to decrease in size, a stretching gesture may cause an avatar to increase in size, and dragging may cause the avatar to change locations. According to another embodiment, an avatar displayed in avatar region 240 may also be displayed, or echoed, on another display, e.g., on a PFD 122 or MFD 124. For example, an avatar in avatar region 240 may display a scaled representation of the full format image on PFD 222. Interaction with the avatar on touchscreen 130 causes a corresponding response to be displayed on PFD 122 or MFD 124. According to one embodiment, performing a gesture on an avatar representing an artificial horizon may add synthetic vision system information to the artificial horizon on PFD 122. According to another embodiment, overlaying a weather radar avatar on a chart avatar may cause a chart displayed on an MFD 124 to also display weather information, e.g., geographically aligned weather information.

Referring to FIG. 2C, the embodiment of FIG. 2B is illustrated as it would appear in use, according to an exemplary embodiment. Checklist avatar 318 and synoptics avatar 320 are shown in avatar region 240. Icon region 230 is shown populated with a plurality of icons. A sun-and-cloud icon, which symbolically represents weather data, is shown in icon location 210a. A silhouette of an aircraft representing synoptics data, a check representing checklist data, and the words "NAV MAP" representing navigational map data are shown in icon locations 210b-210d. A gear icon symbolically representing aircraft systems in location 210e has become an oil can to represent a notification regarding the hydraulic system. This notification icon may change colors, flash, and/or be accompanied by audible or haptic alerts.

According to one embodiment, a first gesture may be made in relation to an icon symbolic of aircraft synoptics, for example, a gear, a silhouette of an aircraft, or simply the word "Synoptics". The first gesture, such as tapping or dragging the icon into avatar region 240 may cause the icon to convert into an avatar. The avatar may then display live synoptics information and may include interactive items. For example, synoptics avatar 320 displays an outline of the fuselage and cabin pressure, temperature, and oxygen levels at various locations within the fuselage. Performing a gesture in relation to one of those readings may cause more detailed information to be displayed, for example, double-tapping the aft temperatures may cause a flight-history trace of the aft temperatures and pressures to be displaced. Another gesture, for example a swipe, may cause the synoptics avatar 320 to return to a less detailed aircraft view, as shown. Other synoptics may be accessed via interaction with pulldown menu 320a.

According to another embodiment, a first gesture may be made in relation to an icon symbolic of a navigation map. For example, the symbolic representation maybe a generic map emblem, a compass arrow, or simply the words "Nav Map". The first gesture may cause the icon to convert into an avatar on the same display or on a second display. The avatar may then display live navigational map information and may include interactive items. For example, the map information displayed may update in relation to movement of the aircraft. Interactive items may include images representing navigational beacons. Gestures in relation to a navigational beacon image may cause more information about the navigational beacon to be displayed. Additional gestures (e.g., pinch, stretch, drag, two-finger drag, swipe, etc.) may cause the avatar to increase or decrease in size to change the information displayed (e.g., location displayed on the map).

Figure 4:
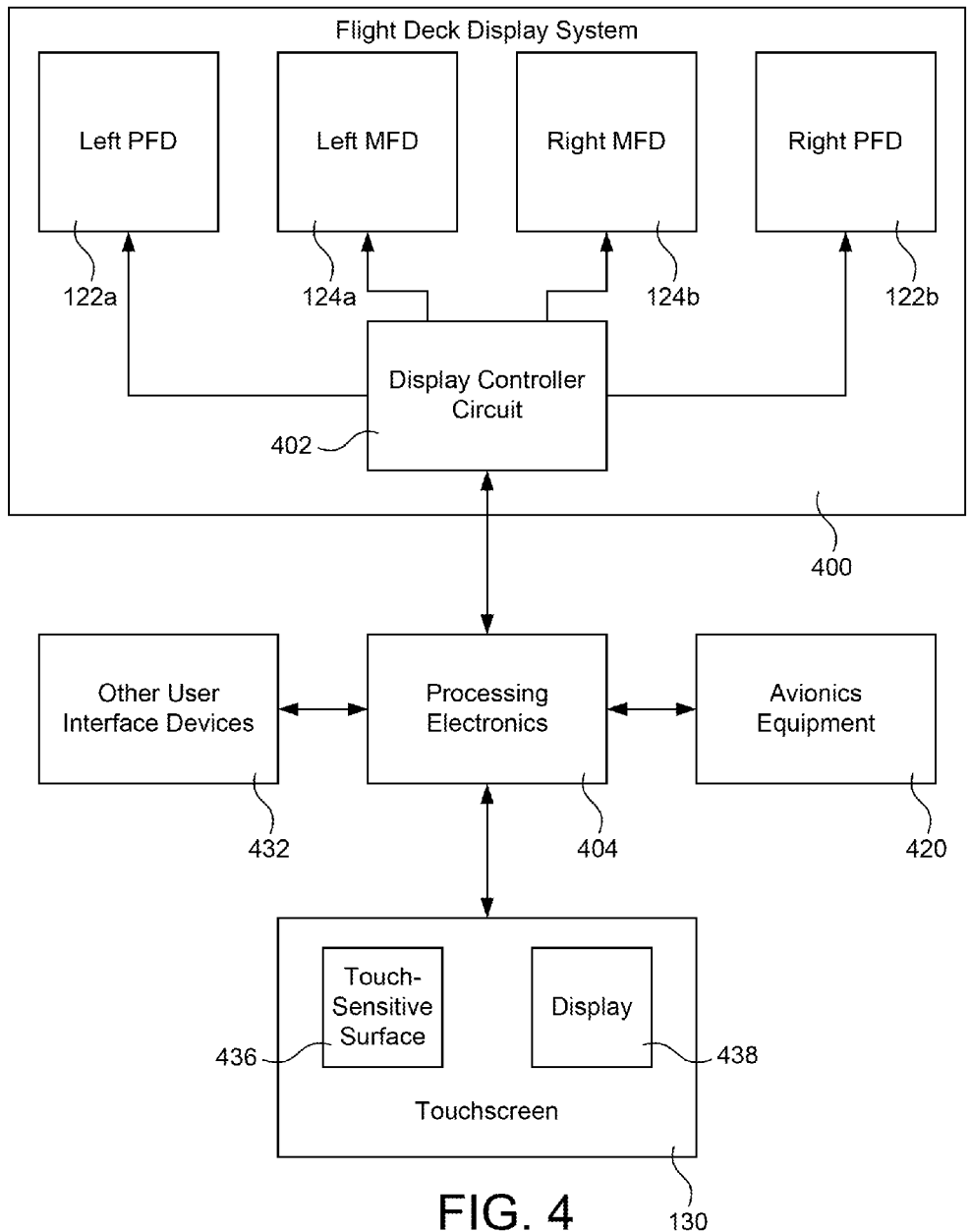
FIG. 4 is a general schematic block diagram of an aviation display control system, according to an exemplary embodiment.

Referring to FIG. 4, a block diagram of the aviation display control system is shown according to an exemplary embodiment. As shown, the aviation display control system includes a flight deck display system 400 and a touchscreen 130 coupled to processing electronics 404. Touchscreen 130 may include a touch-sensitive surface 436 coupled to a display 438. According to one embodiment, touch-sensitive surface 436 overlays display 438. Flight deck display system 400 may include one or more flight deck displays (e.g., PFD 122, MFD 124, etc.) connected (e.g., directly, indirectly) to a display controller circuit 402. Display controller circuit 402 may include any number of mechanical or electrical circuitry components or modules for causing the flight deck displays to display images. For example, circuit 402 may be configured to display images on left PFD 122a and right PFD 122b and display different images on each of left MFD 124a, and right MFD 124b. In other embodiments, circuit 402 may be configured to swap or exchange the images displayed on forward displays. In another embodiment, flight deck display system 400 includes other displays on the flight deck, for example, display 438 of touchscreen 130 or an electronic flight bag and may be configured to swap or exchange images between touchscreen display 438 and PFD 122 or MFD 124. In yet other embodiments, flight deck display system 400 may include touch-sensitive surface 436, in which case circuit 402 may provide touch input to processing electronics 404. For example, PFD 122 or MFD 124 may be a touchscreen.

Processing electronics 404 can also be configured to provide control signals or control logic to circuit 402. For example, depending on pilot or situational inputs, processing electronics 404 may be configured to cause circuit 402 to change behavior. In other words, processing electronics 404 may include the processing logic for flight deck display system 400. Processing electronics 404 can also be configured to output indications, notifications, alerts, warnings, etc., to PFD 122 or MFD 124.

Processing electronics 404 may be coupled to other user interface devices 432, such as cursor control devices 132 or an electroacoustic transducer configured to receive audio input. The other user interface devices 432 may include or operate as redundant input systems.

Processing electronics 404 are further shown as connected to avionics equipment 420 which may generally include any number of sensors, systems, or subsystems configured to provide data to processing electronics 404. For example, avionics equipment 420 could include temperature sensors, humidity sensors, infrared sensors, altitude sensors, pressure sensors, airspeed sensors, ground speed sensors, pitot-static tubes, a gyroscope, a global positioning system (GPS), or any other aircraft-mounted sensors that may be used to provide data to processing electronics 404. It should be appreciated that avionics equipment 420 (or any other component shown connected to processing electronics 404) may be indirectly or directly connected to the processing electronics 404. Avionics equipment 420 may be or include a flight management system, a navigation system, a backup navigation system, or another aircraft system configured to provide inputs to processing electronics 404. For example, avionics equipment 420 may provide controls inputs, such as throttle or power level.

Touchscreen 130 is shown as coupled to processing electronics 404. In various embodiments, it should be understood that touchscreen 130 may have a wireless or wired connection to processing electronics 404. Touchscreen 130 may be part of a device integrated into an aircraft control center or may be part of a mobile device capable of wired or wireless communication with processing electronics 404. Both processing electronics 404 and touchscreen 130 may include one or more interfaces capable of wired or wireless transmission.

Figure 5:
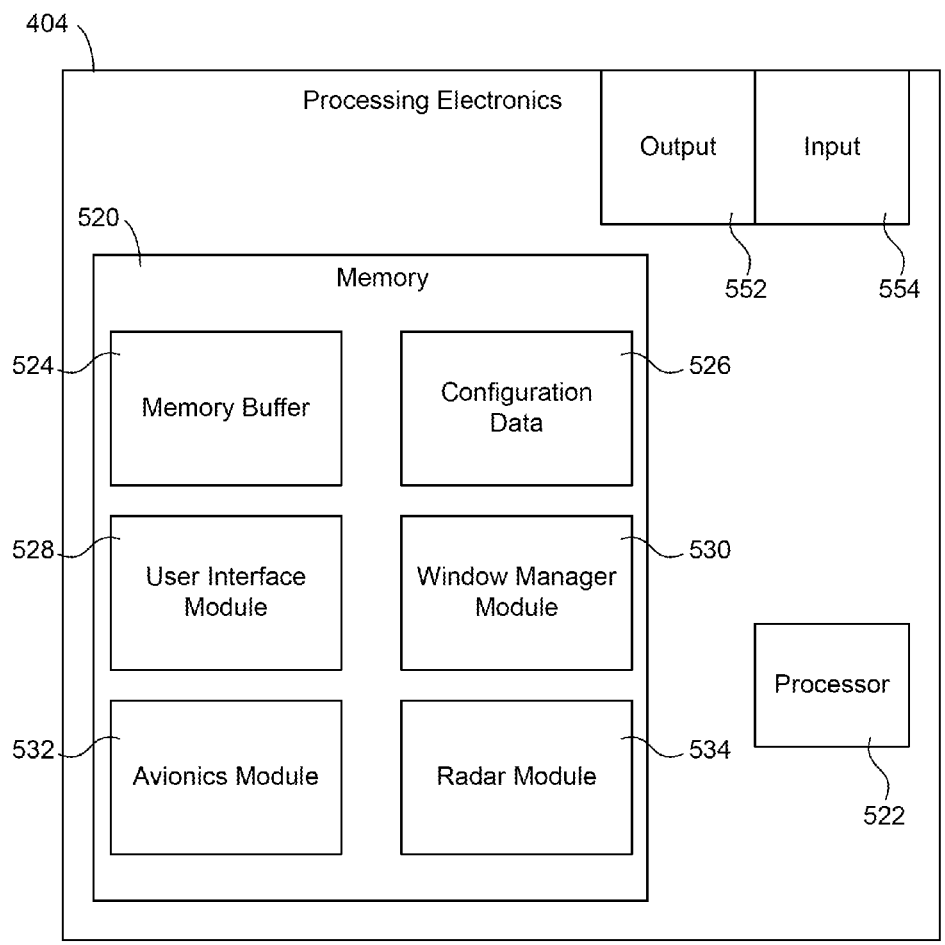
FIG. 5 is a general schematic block diagram of the processing electronics of the aviation display control system of FIG. 4, according to an exemplary embodiment.

Referring to FIG. 5, a detailed block diagram of processing electronics 404 of FIG. 4 is shown, according to an exemplary embodiment. Processing electronics 404 includes a memory 520 and processor 522. Processor 522 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 522 is configured to execute computer code stored in memory 520 to complete and facilitate the activities described herein. Memory 520 can be any volatile or non-volatile memory device capable of storing data or computer code relating to the activities described herein. For example, memory 520 is shown to include modules 528-534 which are computer code modules (e.g., executable code, object code, source code, script code, machine code, etc.) configured for execution by processor 522. When executed by processor 522, processing electronics 404 is configured to complete the activities described herein. Processing electronics 404 includes hardware circuitry for supporting the execution of the computer code of modules 528-534. For example, processing electronics 404 includes hardware interfaces (e.g., output 552) for communicating control signals (e.g., analog, digital) from processing electronics 404 to circuit 402. Processing electronics 404 may also include an input 554 for receiving, for example, display data from circuit 402, user input from touchscreen 130, flight data from avionics equipment 420, or for receiving data or signals from other systems or devices.

Memory 520 includes a memory buffer 524 for receiving radar return data, avionics data, and user input data. The data may be stored in memory buffer 524 until buffer 524 is accessed for data. For example, user interface module 528, window manager module 530, radar module 534, or another process that utilizes user input data may access buffer 524. The user input data stored in memory 520 may be stored according to a variety of schemes or formats. For example, the user input data may be stored in an x,y or x,y,z format, gesture-centric, or any other suitable format for storing spatial-relative information.

Memory 520 further includes configuration data 526. Configuration data 526 includes data relating to flight deck display system 400 and touchscreen 130. For example, configuration data 526 may include display operational data which may be data that window manager module 530 can interpret to determine how to command circuit 402 to operate a PFD 122, MFD 124, touchscreen display 438, or other flight deck display. For example, configuration data 526 may include information regarding size, resolution, refresh rates, orientation, location, spatial relationships between touchscreen 130 and the forward displays, and the like. Configuration data 526 may include information touchscreen operational data which may be data that user interface module 528 can use to interpret user input data from memory buffer 524 or touch sensitive surface 436. For example, configuration data 526 may include information regarding the size, resolution, sensitivity, and the like.

Memory 520 further includes a user interface module 528, which includes logic for using user input data in memory buffer 524 to determine desired user responses. User interface module 528 may be configured to interpret user input data to determine various gestures (e.g., drag versus swipe versus tap), the direction of gestures, and the relationship of these gestures to icons, icon locations 210, icon regions 230, avatars, avatar locations 212, or avatar regions 240. User interface module 528 may include logic to provide input confirmation and to prevent unintended input. For example, logic to activate single-finger touch only at the moment and location the finger is lifted may be used. This allows the crew to use the touch surface to stabilize their hand, thereby adding more accuracy to the command than if it activated at the time or location the finger contacted the surface. For example, formats, avatars, icons, virtual controls, and other objects may use visual, audible, and tactile feedback to indicate selection. Color halos, object color, or other style changes, audible tones, or voice repetition of input commands, and/or tactile feedback can be useful in making the crew more aware of touch input.

Memory 520 further includes a window manager module 530, which may include logic for causing a display to provide an icon, avatar, or full format image. Window manager module may receive input from user interface module 528, avionics module 532, radar module 534, or other modules. According to various embodiments, window manager module 530 may include logic to scale layers of an avatar at different rates, to move representations of data among screens, to swap displayed images, and to display real-time or live data as it is updated.

Window manager module 530 may include logic for determining a desired format of an icon, avatar, or full format image. Window manager module 530 may determine a format of multiple full format images for display if multiple full format images are to be displayed on a single forward display. For example, referring also to FIG. 2C, window manager module 530 may determine a desired format of checklist 318 and synoptics information 320 if such information is to be displayed side-by-side in the forward display. The activities of window manager module 530 are described in greater detail in subsequent figures related to specific window management functions.

Memory 520 is further shown to include avionics module 532, which may include logic for receiving and interpreting sensor readings and controls inputs (e.g., throttle position, flaps position, etc.). Avionics module 532 may include logic for exchanging information between aircraft systems and subsystems. For example, avionics module 532 may receive sensor readings from a sensor and provide sensor data to window manager module 530 to be displayed on PFD 122. Avionics module 532 may include logic for, or communicate with other modules that are configured for communications, navigation, flight control systems, weather, etc. For example, avionics module 532 may receive radar return data from radar module 534 or memory buffer 524.

Memory 520 is further shown to include radar module 534. Radar module 534 may be an algorithm for commanding circuit 402 to sweep a radar beam. Radar module 534 may be used, for example, to send one or more analog or digital control signals to the radar control circuit. The control signals may be, for example, an instruction to move the antenna mechanically, an instruction to conduct an electronic beam sweep in a certain way, an instruction to move the radar beam to the left by five degrees, etc. Radar module 534 may be configured to control timing of the beam sweeps or movements relative to aircraft speed, flight path information, transmission or reception characteristics from the weather radar system or otherwise. Radar module 534 may receive data from configuration data 526 for configuring the movement of the radar beam.

Figure 6:
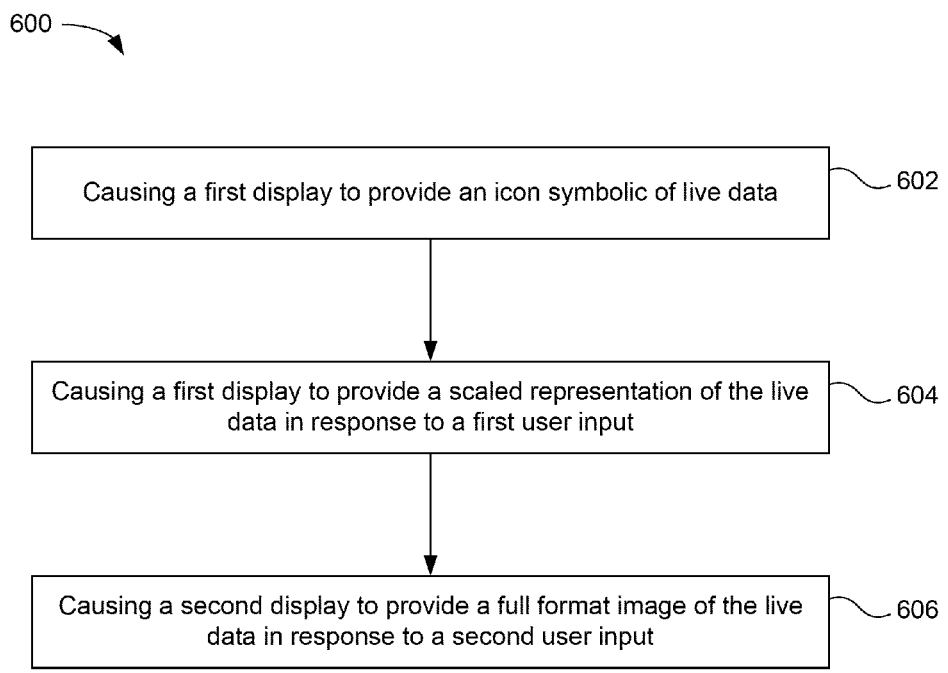
FIG. 6 is a schematic flow chart of a process for controlling an aviation display, according to an exemplary embodiment.

Referring to FIG. 6, a flowchart of process 600 for controlling an aviation display is shown according to an exemplary embodiment. Process 600 is shown to include the steps of causing a first display to provide an icon symbolic of live data (step 602), causing a first display to provide a scaled representation of the live data in response to a first user input (step 604), and causing a second display to provide a full format image of the live data in response to a second user input (step 606).

Figure 7:
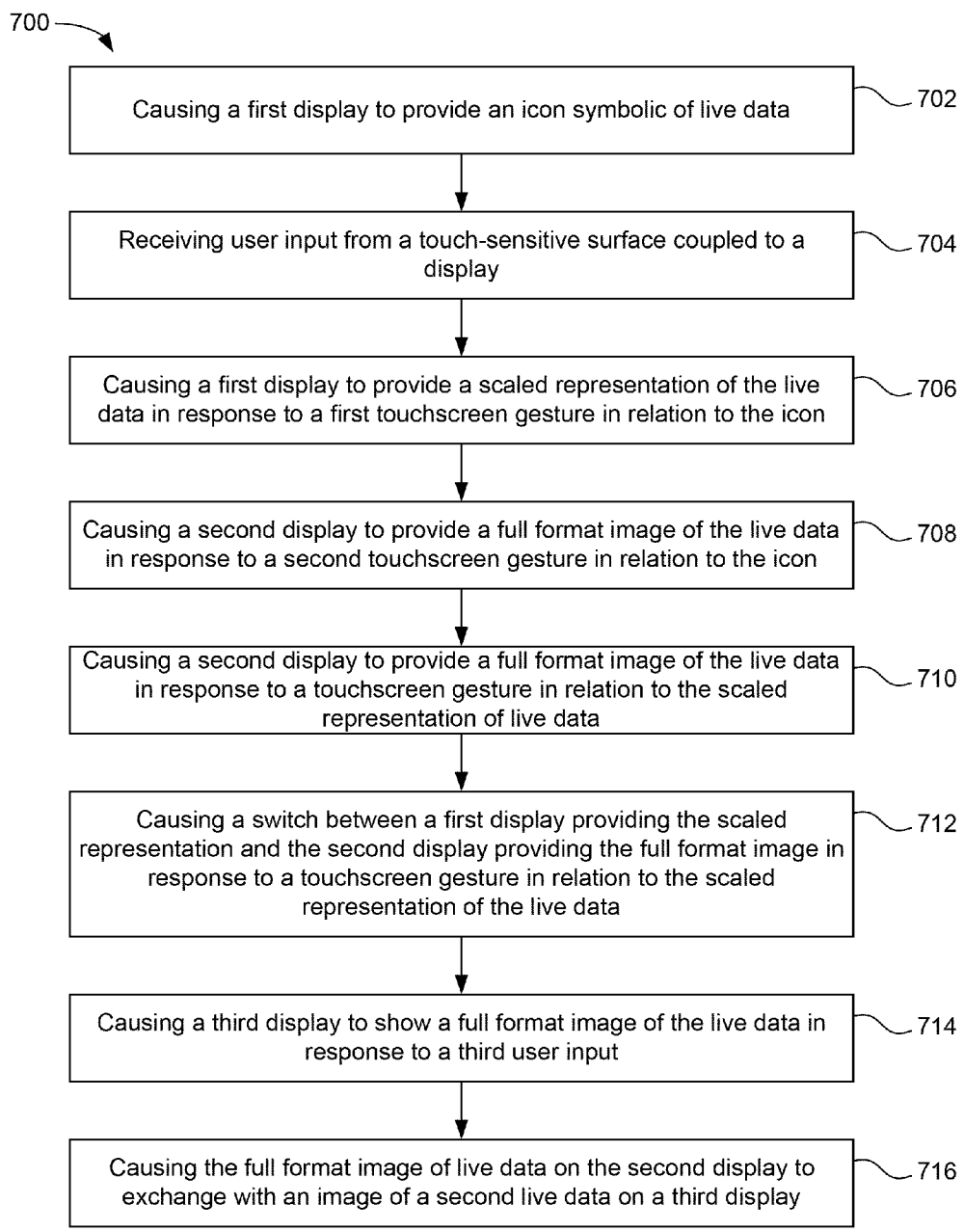
FIG. 7 is a schematic flow chart of a process for controlling an aviation display, according to another exemplary embodiment.

Referring to FIG. 7, a flowchart of process 700 for controlling an aviation display is shown according to an exemplary embodiment. Process 700 is shown to include the steps of causing a first display to provide an icon symbolic of live data (step 702) and receiving user input from a touch-sensitive surface coupled to a display (step 704). According to various embodiments, the user input from the touch-sensitive surface may be any suitable gesture (e.g., tap, touch, swipe, drag, flick, pinch, stretch, multiple-finger swipe, etc.). Process 700 is shown to further include the steps of causing a first display to provide a scaled representation of the live data in response to a first touchscreen gesture in relation to the icon (step 706) and causing a second display to provide a full format image of the live data in response to a second touchscreen gesture in relation to the icon (step 708). According to various embodiments, the first touchscreen gesture and the second touchscreen gesture may be the same, different, or repeated gestures. According to one embodiment, the first touchscreen gesture is a single tap, and a second touchscreen gesture is a double tap. According to various embodiments, the first touchscreen gesture may include swiping from an icon location 210 to an avatar location 212, dragging an icon from an icon location 210 to in avatar location 212, etc, on touchscreen 130. According to various other embodiments, the second touchscreen gesture may include swiping from an icon location 210 to a PFD location 222 or an MFD location 224, dragging an icon from an icon location 210 to a PFD location 222 or MFD location 224, flicking from an icon location 210 in a direction indicative of the desired PFD 122 or MFD 124, or flicking from an icon location 210 towards the location of the desired PFD 122 or MFD 124 on the flight deck.

Process 700 is further shown to include the steps of causing a second display to provide a full format image of the live data in response to a touchscreen gesture in relation to the scaled representation of the live data (step 710) and causing a switch between a first display providing the scaled representation and the second display providing the full format image in response to a touchscreen gesture in relation to the scaled representation of the live data (step 712). According to various embodiments, the gesture in relation to the scaled representation of the live data may include dragging or swiping from an avatar location 212 to a PFD location 222 or MFD location 224 on touchscreen 130, tapping or double tapping an avatar, or flicking from an avatar location 212 or avatar region 240 in a direction indicative of the desired PFD 122 or MFD 124 (e.g., predetermined edge or corner of touchscreen 130) or towards the location of the desired PFD 122 or MFD 124 on the flight deck. According to one embodiment, performing a gesture in relation to an avatar on touchscreen 130 (e.g., twisting, flicking, etc.) may cause the corresponding first live data to become displayed as a full format image on PFD 122 or MFD 124, and the second live data displayed as the full format image on PFD 122 or MFD 124 becomes displayed as an avatar on touchscreen 130.

Process 700 is further shown to include the steps of causing a third display to show a full format image of the live data in response to a third user input (step 714) and causing the full format image of live data on the second display to exchange with an image of a second live data on a third display. The third user input may be the same or different than the first and/or second user inputs. As described above for step 710, a variety of gestures in relation to an icon or avatar may cause left PFD 122a, left MFD 124a, right MFD 124b, and/or right PFD 122b to display full format image of live data. Various gestures described above may also be used to swap or exchange the information displayed on various flight deck displays. According to one embodiment, the left seat (e.g., pilot's seat) and right seat (e.g., copilot's seat) can have all of their display formats swapped by sliding an icon across touchscreen 130. For example, sliding an image of a pilot's cap from a first position to a second position may cause the information displayed on left PFD 122a and left MFD 124a to exchange places with the information displayed on right PFD 122b and right MFD 124b, respectively. Allowing easy switching of displays allows different crew members to take control of the aircraft, for example, during rest breaks or emergencies. Further, this may allow a copilot to prepare displays in advance and place them in front of the pilot at an appropriate time, for example, preparing an airport map prior to landing or preparing weather and navigation maps prior to takeoff.

Figure 8:
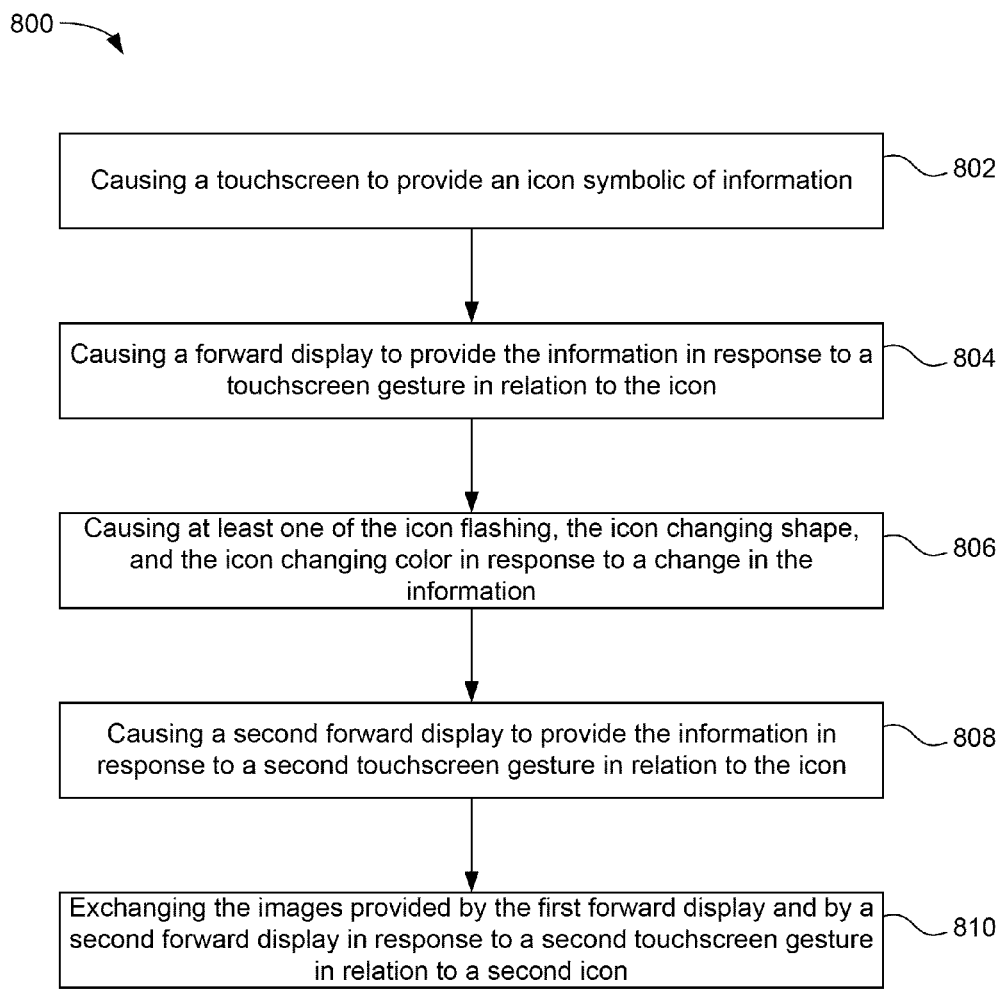
FIG. 8 is a schematic flow chart of a process for controlling an aviation display system including a touchscreen and a forward display, according to another exemplary embodiment.

Referring to FIG. 8, a flowchart of process 800 for controlling an aviation display system including a touchscreen and a forward display is shown according to an exemplary embodiment. Process 800 is shown to include the steps of causing a touchscreen to provide an icon symbolic of information (step 802) and causing a forward display to provide the information in response to a touchscreen gesture in relation to the icon (step 804). According to one embodiment, applying a gesture in relation to an icon (e.g., flicking the icon, tapping the icon, flicking the icon towards a desired forward display, etc.) may cause the live data represented by the icon to be displayed on PFD 122 or MFD 124.

Process 800 is further shown to include the step of causing at least one of the icon flashing, the icon changing shape, and the icon changing color in response to a change in the information (step 806). For example, the silhouette of an aircraft icon may become a flashing red thermometer in response to an engine overheating or may become a yellow oil can in response to hydraulic pressure approaching an operating limit.

Process 800 is further shown to include the steps of causing a second forward display to provide the information in response to a second touchscreen gesture in relation to the icon (step 808) and exchanging the images provided by the first forward display and by a second forward display in response to a second touchscreen gesture in relation to a second icon (step 810). According to one embodiment, applying a gesture in relation to the icon (e.g., flicking the icon, tapping the icon, flicking the icon towards a desired forward display, etc.) may cause the live data represented by the icon to be displayed on a second PFD 122 or MFD 124. The live data may be represented instead of on the first display or in addition to the first display. For example, on landing, the copilot may place a map of the airport on both left PFD 122a and right PFD 122b. According to another embodiment, left seat (e.g., pilot's seat) and right seat (e.g., copilot's seat) can have all of their display formats swapped by performing a second gesture in relation to an icon of a pilot's cap. For example, sliding an image of a pilot's cap from a first position to a second position may cause the information displayed on left PFD 122a and left MFD 124a to exchange places with the information displayed on right PFD 122b and right MFD 124b, respectively. Allowing easy switching of displays allows different crew members to take control of the aircraft, for example, during rest breaks or emergencies. Alternatively, the second gesture may be in relation to an icon representing the second display. For example, swiping from an icon representing left PFD 122a to and icon representing right MFD 124b causes the images provided on those displays to be exchanged.

Generally referring to FIGS. 1-8, touchscreen 130 is generally described as integrated into the aircraft display, as shown in FIG. 1. In other embodiments, touchscreen 130 may be part of a mobile device or other device capable of wired or wireless communication with the rest of the electronics of the aircraft. Referring generally to the subsequent figures, touchscreen 130 is generally described as part of a mobile device; however, it should be understood that touchscreen 130 may be part of an integrated aircraft display without departing from the scope of the present disclosure. In one embodiment, touchscreen 130 may be part of a handheld electronic device, such as a tablet computer (e.g., iOS, Android, Windows, and Linux based tablets, Apple iPad, etc.), and may wired or wirelessly connect to the electronics of the aircraft. A pilot, co-pilot, or other user may then carry around the electronic device and operate the electronic device to control the displays in the aircraft or to control the displays in another aircraft or flight simulator.

Referring generally to FIGS. 2-8, systems and methods for selecting icons or avatars in order to display corresponding data on a display are shown and described. Referring now generally to FIGS. 9-10, systems and methods relating to the placement of such data on the displays are described in greater detail.

Referring now to FIGS. 9A-B, schematic illustrations of a touchscreen 130 are shown, according to another exemplary embodiment. Touchscreen 130 is shown to include a bottom portion 920 with multiple icon locations 210 and avatar locations 212, and a top portion 922 (e.g., a forward display location) with multiple predefined locations 902-914. As used in this disclosure, a predefined location refers to a predefined area, region, or portion (or volume for a 3-D display) of a display in which a representation of aviation data may be shown. According to the exemplary embodiments shown, the predefined location has a predefined size and shape. Icon locations 210, icons, avatar locations 212, and avatars may be as described with reference to FIGS. 2A-B. It should be understood that while bottom portion 920 shows a combination of icons and avatars in bottom portion 920, in other embodiments, bottom portion 920 may include any number of icons or avatars, or just one of icons or avatars. Further, while icons and avatars are shown in a bottom portion 920 in FIGS. 9A-B, it should be understood that the icons and avatars may be located at the top, on the sides, or any combination thereof, of touchscreen 130.

Figure 9C:
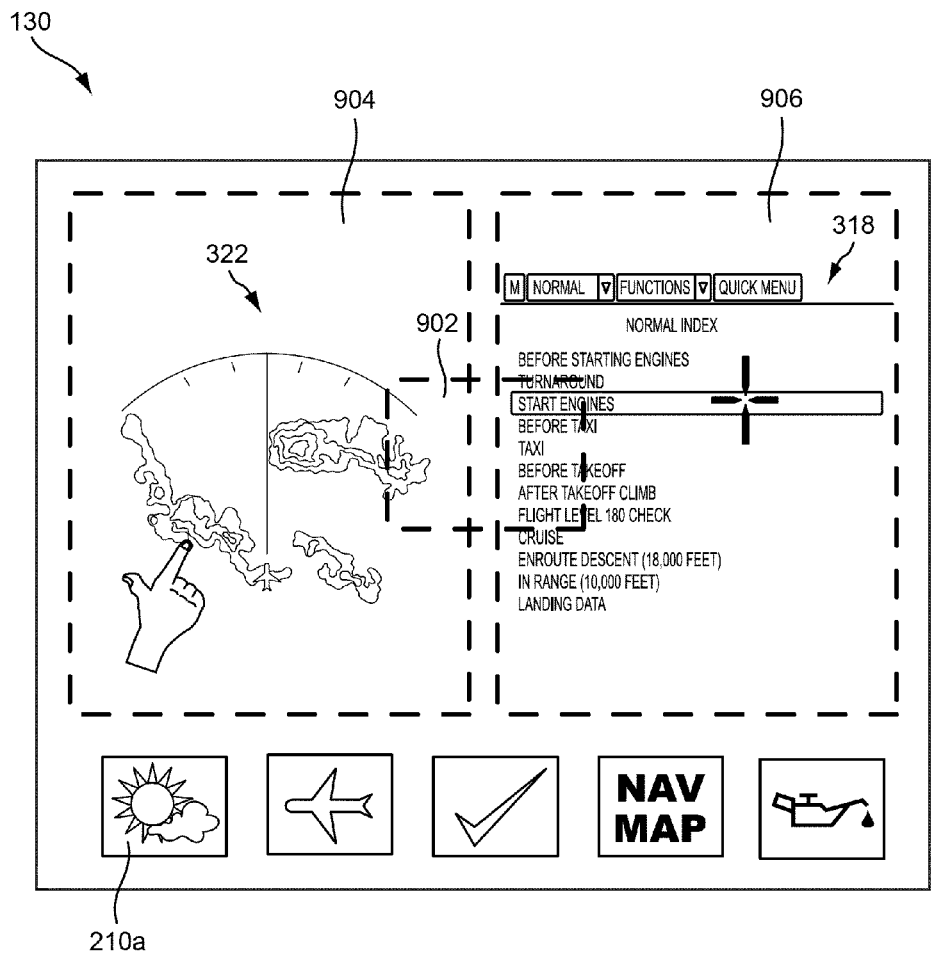
FIG. 9C is an illustration of the aviation display interface of FIG. 9A, according to an exemplary embodiment.

In the embodiment of FIGS. 9A-B, a user may select an icon 210a-e or avatar 212a-d in bottom portion 920. Upon selection of icon 210a-e or avatar 212a-d, a full format representation of the icon or avatar may be presented in one of the predefined locations of top portion 922. For example, also referring to FIG. 9C, if icon location 210a corresponds to an icon representing live weather radar, a user may select the icon and live weather radar 322 may be displayed in a predefined location 904.

In one embodiment, the predefined locations may generally correspond to one or more PFDs or MFDs as described in the present disclosure. For example, the entirety of top portion 922 may correspond with a single PFD or MFD. A user may select icons and avatars on touchscreen 130 for display on top portion 922, and the display may be provided on a PFD or MFD. As another example, a predefined location may generally correspond to a single PFD or MFD. A left predefined location 904 may correspond with a left PFD 222a while a right predefined location 906 may correspond with a right PFD 222b. As yet another example, an upper left predefined location 908 may correspond with a PFD, a lower left predefined location 910 may correspond with another PFD, and so forth. As yet another example, a predefined location 902 may correspond with multiple displays, e.g., dragging an icon or avatar to location 902 may result in multiple displays showing the same data. It should be understood that any combination of predefined locations and PFDs or MFDs are possible.

In one embodiment, when a user "drags and drops" an icon or avatar into a predefined location, the user may affect which PFD or MFD displays the corresponding data. For example, an upper leftward motion by the user may result in the data being displayed on a left PFD 222a or left MFD display 224.

Referring more specifically to FIG. 9A, in one embodiment, three predefined locations 902, 904, 906 are shown presented to a user. Location 902 may correspond to a full screen option that, when selected by a user, displays data related to the icon or avatar on the entire top portion 922. Location 904 may correspond to an option that, when selected by a user, displays data on the left side of top portion 922. Location 906 may correspond to an option that, when selected by a user, displays data on the right side of top portion 922. Referring to FIG. 9B, in another embodiment, location 902 may correspond to a full screen options, while locations 908, 910, 912, 914 correspond to an upper left, lower left, upper right, and lower right location, respectively. It should be understood that any geometric combination of predefined locations may be defined on touchscreen 130, e.g., top portion 922 may be divided into any number of distinct predefined locations of the same or different sizes in which different data may be displayed.

In one embodiment, touchscreen 130 may be configured to display the predefined locations for a user. For example, when a user initially selects an icon or avatar, top portion 922 may display an outline of each possible predefined location 902-914 to the user, allowing the user to view and select one of the predefined locations. As another example, top portion 922 may be configured to, regardless of user selection of an icon or avatar, display an outline of each predefined location 902-914 to the user, or may be configured to display an outline of predefined locations not currently being occupied by live data. Touchscreen 130 and top portion 922 may display the predefined locations in a variety of formats. For example, a border of each predefined location may be displayed (e.g., highlighted or flashing), the entire area of each predefined location may be grayed out or shaded in any color, or the like. As another example, text, symbols, or other icons may be displayed within each predefined location that identifies the predefined location to the user, e.g., "full" for predefined location 902, "left" for predefined location 904, "upper left" for predefined location 908, and so forth. The representations of data in the predefined locations 902-914 may be full-format or avatar representations of the live data.

In one embodiment, the predefined locations to display may be determined upon selection of an avatar or icon. For example, assuming a weather radar may be capable of being displayed in a full screen format, half-screen (left or right, top or bottom) format, or a quarter-screen format (as shown in FIG. 9B). Therefore, if a weather radar icon or avatar is selected, the corresponding predefined location options may be displayed. As another example, assuming checklist information may be formatted such that it can only be displayed in full screen or half-screen format. In such a case, the quarter-screen predefined locations may not be presented to the user upon selection of a checklist icon or avatar. As another example, it may be preferred that, upon selection of an icon or avatar relating to an airport map, that the airport map is displayed on the full screen in top portion 922. Therefore, only one predefined location, representing a full screen option, may be presented to the user. In one embodiment, a user of touchscreen 130 may identify display preferences prior to operation for each icon or avatar, or such preferences may be predetermined by, for example, processing electronics 404.

The user selection of an icon or avatar and of predefined locations may vary according to various embodiments. In one embodiment, the user may "drag and drop," in which a user presses down on an icon or avatar, and drags his or her finger to a predefined location and lifts his or her from the screen to drop or pin the representation of data in the predefined location. In another embodiment, the user may press down or tap on an icon or avatar, and then press down or tap on a predefined location in order to display the associated data in the predefined location. According to one embodiment, dragging the avatar or icon to the predefined location causes a preview of the representation to be shown in that predefined location. The user may continue to drag the icon or avatar to other predefined locations, causing a preview representation to be shown in the predefined location through which the avatar or icon is being dragged. The user may drag the avatar or icon back to the bottom portion 920, wherein no representation of the data is shown in the predefined locations, or the user may provide a gesture (e.g. drop, etc.) relative to one of the predefined locations causing a representation of to reside (e.g., be pinned, to be shown in the predefined location until acted upon or otherwise displaced, etc.) in the predefined location.

By having multiple predefined locations, touchscreen 130 is configured to display multiple types of live data to a user of touchscreen 130. For example, a user may select a first icon 210a and display the associated data in location 908. Then, if a user selects a second icon 210b, the user may select one of locations 910, 912, or 914 to display the associated data. The user may continue to select icons or avatars and predefined locations to display the associated data in. As another example, a user may select a first avatar 212a and display the associated data in location 904. Then, if a user selects a second avatar 212b, if there is just one unused predefined location 906, the associated data may be displayed there.

Referring more specifically to FIG. 9C, a user is shown selecting an icon location 210a corresponding with weather data. In one embodiment, the user may select icon location 210 by pressing down on touchscreen 130 and dragging his or her finger on touchscreen 130. By dragging his or her finger, the user may select the area in which to display the weather radar. In FIG. 9C, the user is shown dragging weather radar 322 onto left location 904 for display. In FIG. 9C, checklist 318 is being shown in right location 906. If the user selects left location 904 for weather radar display, weather radar 322 may then be displayed alongside checklist 318. In various other embodiments, if the user selects full location 902 or right location 906 for weather radar display, checklist 318 may then be moved or removed from display. For example, the checklist may become an icon 210 or an avatar 212 in a bottom portion of the display, or may become an icon 210 or an avatar 212 in another display (e.g., EFB, tray table display, etc.). Such displacement of the previously shown representation facilitates user prioritization of more critical information over less critical information.

Top portion 922 may correspond to one or more PFDs 122 or MFDs 124, according to one embodiment. For example, top portion 922 may correspond to a single PFD display location such as left PFD display location 222a or right PFD display location 222b. As another example, one or more regions 902-910 may correspond to a single PFD or MFD display location.

Figure 10A:
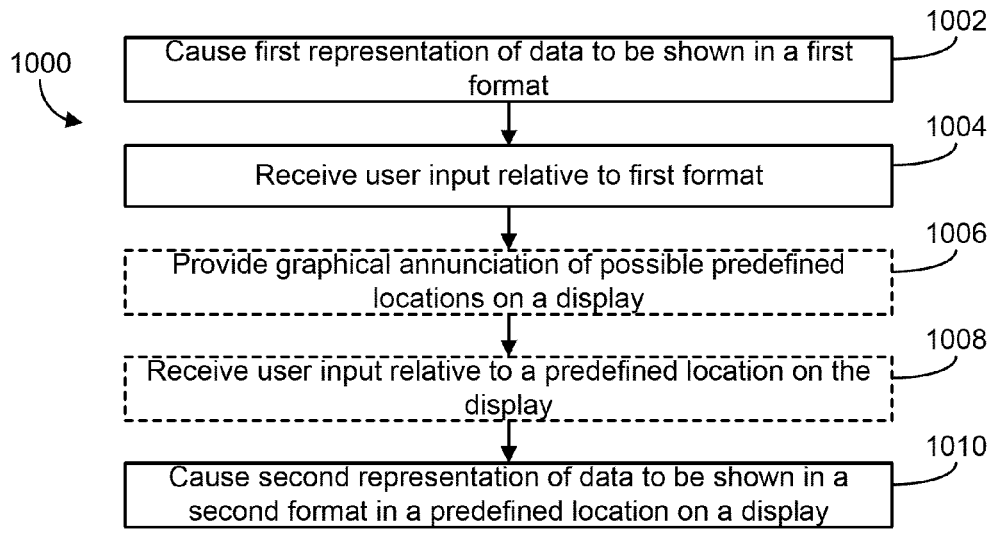
FIG. 10A is a schematic flow chart of a process for controlling an aviation display, according to another exemplary embodiment.

Referring now to FIG. 10A, a schematic flow chart of a process 1000 for controlling an aviation display is shown. Process 1000 includes causing a first representation of data to be shown in a first format (step 1002). Step 1002 may generally include the displaying of one or more icons or avatars on touchscreen 130 as described in the present disclosure.

Process 1000 further includes receiving a user input relative to the first format (step 1004). Step 1004 may generally include the user selection of an icon or avatar. Process 1000 further includes causing a second representation of data to be shown in a second format in a predefined location on a display (step 1010). For example, step 1010 may include the step of retrieving the second representation of data, e.g., a live weather radar if the first representation of data was a weather radar icon. Step 1010 may then include displaying the live weather radar in a predefined location (as illustrated in FIG. 9C) on the display.

Process 1000 may further include optional steps relating to the display and selection of the predefined locations. Process 1000 may include providing a graphical annunciation of possible predefined locations on a display (step 1006). For example, step 1006 may include determining possible predefined locations on the display for which live data may be displayed, and presenting the locations to the user by highlighting the locations in any manner. In one embodiment, the user input may be used to help determine which predefined locations to present to the user. Process 1000 may further include receiving a user input relative to the predefined location on the display (step 1008). For example, step 1008 may include receiving a user input in the form of a tap on touchscreen 130 indicating a selection of a predefined location on touchscreen 130.

Figure 10B:
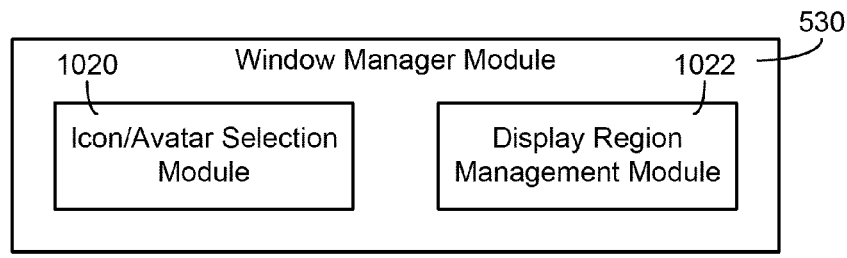
FIG. 10B is a detailed block diagram of the window manager module of FIG. 5 in accordance with the activities of the process of FIG. 10A, according to an exemplary embodiment.

Referring now to FIG. 10B, window manager module 530 is shown in greater detail. Window manager module 530 is shown to include sub-modules that support the activities of FIGS. 9A-C and 10A, according to an exemplary embodiment. Window manager module 530 may include an icon/avatar selection module 1020. Upon selection of an icon or avatar (e.g., step 1004 of process 1000), module 1020 may be configured to provide a representation of data to the user. For example, for a "drag and drop" configuration, the user may attempt to select an icon or avatar for a predefined location by dragging his or her finger along touchscreen 130. In such an embodiment, module 1020 may be configured to generate an enlarged image of the data, representative of a full format representation of the data, moving along with the user input. In other words, module 1020 may be configured to provide a display of data to assist the user during operation of touchscreen 130.

Window manager module is shown to include a display region management module 1022. Module 1022 may be configured to manage the use of the various predefined locations of touchscreen 130 and top display 922. For example, upon user selection of an icon or avatar, module 1022 may be configured to determine which predefined locations to present to the user as display options for the data associated with the icon or avatar. For example, module 1022 may determine all possible options, e.g., full screen, half-screen, quarter-screen, etc. for display of data related to an icon or avatar. As another example, if data is currently occupying a section of top portion 922, module 1022 may determine which sections are being unused, and determine which predefined locations should be eligible for selection by the user. In other words, module 1022 may manage the predefined locations such that the user is presented with all possible options for display of data related to a selected icon or avatar.

Referring generally to FIGS. 9-10, the selection of icons and avatars for the display of data on the forward display location is described. Referring generally now to FIGS. 11-12, the manipulation of the current displays of data on the forward display location is described. The manipulation of the current displays of data may include one or more of: swapping positions of data in the display, repositioning data in the display, resizing data in the display, or removing data in the display.

Figure 11A:
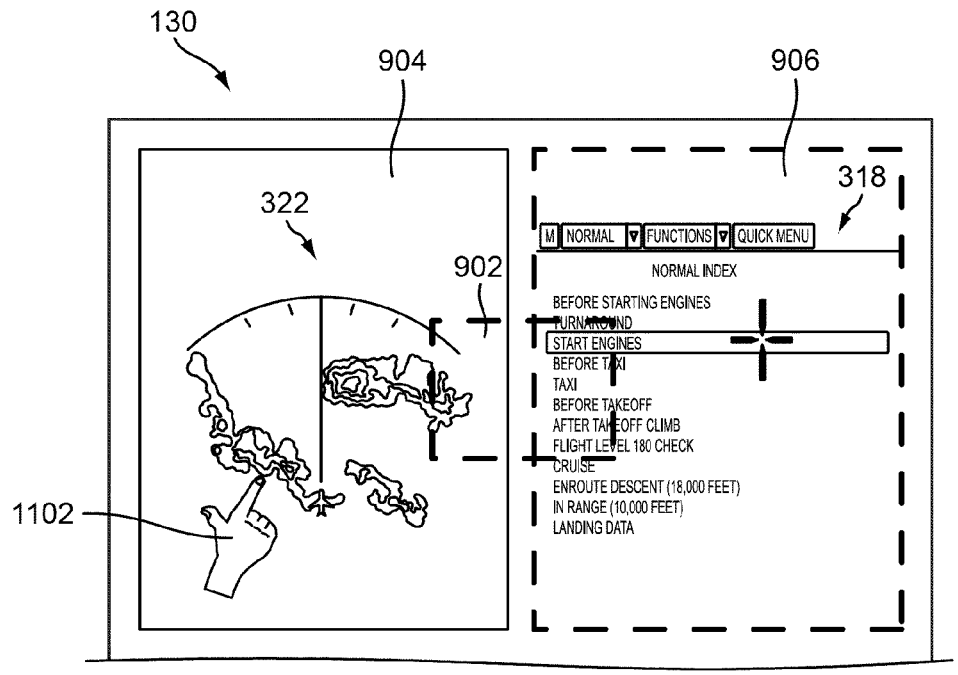
FIGS. 11A-F are illustrations of an aviation display interface, illustrating a swapping process, according to an exemplary embodiment.

Referring to FIG. 11A, a touchscreen 130 display (e.g., a top portion 922 or forward display location) is illustrated. A left predefined location 904 and a right predefined location 906 are shown occupied by a weather radar 322 and checklist 318, respectively. A user input may be received by touchscreen 130 relating to a selection of weather radar 322 (illustrated in FIG. 11A by hand 1102).

Figure 11B:
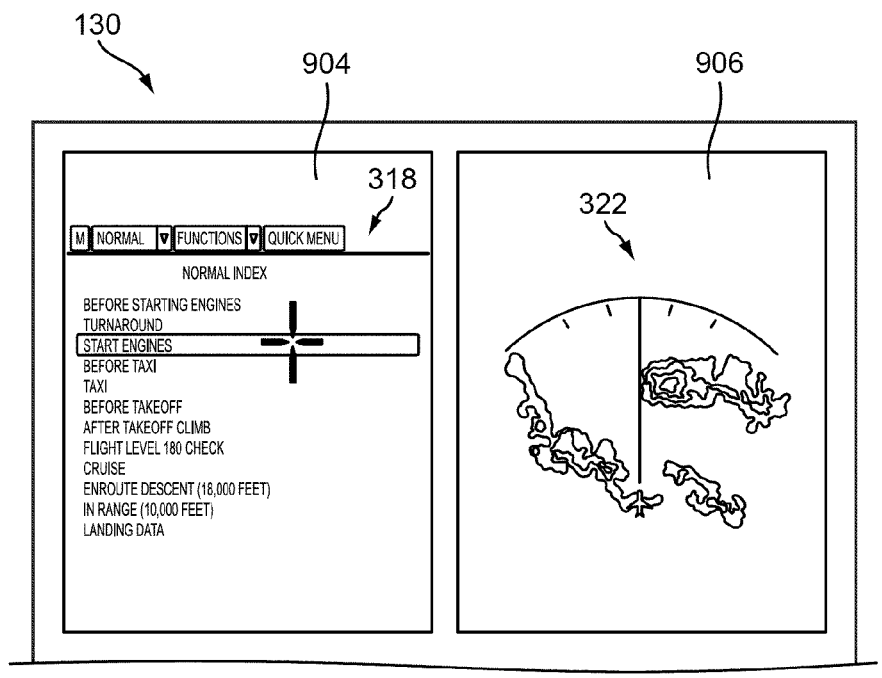
Figure 11C:
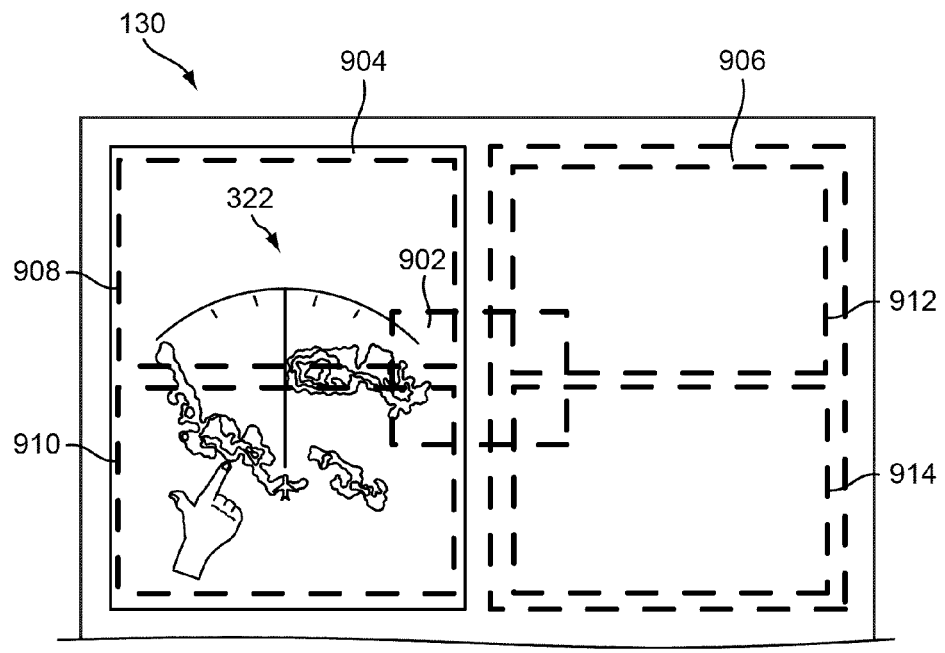

When the user input is detected by touchscreen 130, options may be displayed to the user for the purposes of swapping data between two or more predefined locations. For example, in FIG. 11A, when the user selects weather radar 322, other possible predefined locations 902, 906 that weather radar 322 may be displayed in may be presented to the user in any format. The user may then drag his or her finger (or other input device) to predefined location 902 or 906 to move weather radar 322. Referring also to FIG. 11B, the result of the user selecting predefined location 906 is shown. Weather radar 322 is shown moved to location 906. As a result, checklist 318, previously shown in location 906, is then swapped and moved to the predefined location 904 vacated by weather radar 322.

In one embodiment, data may be in a first predefined location while there is no data in one or more other predefined locations. In such a scenario, when a user selects a new un-occupied location for data currently in the first predefined location, the data may be moved with no other adjustment to the display. For example, if weather radar 322 is being displayed in location 904 but no other data is being shown, the user may move weather radar 322 to location 906 as described above, while location 904 is adjusted to display no data.

Figure 11D:
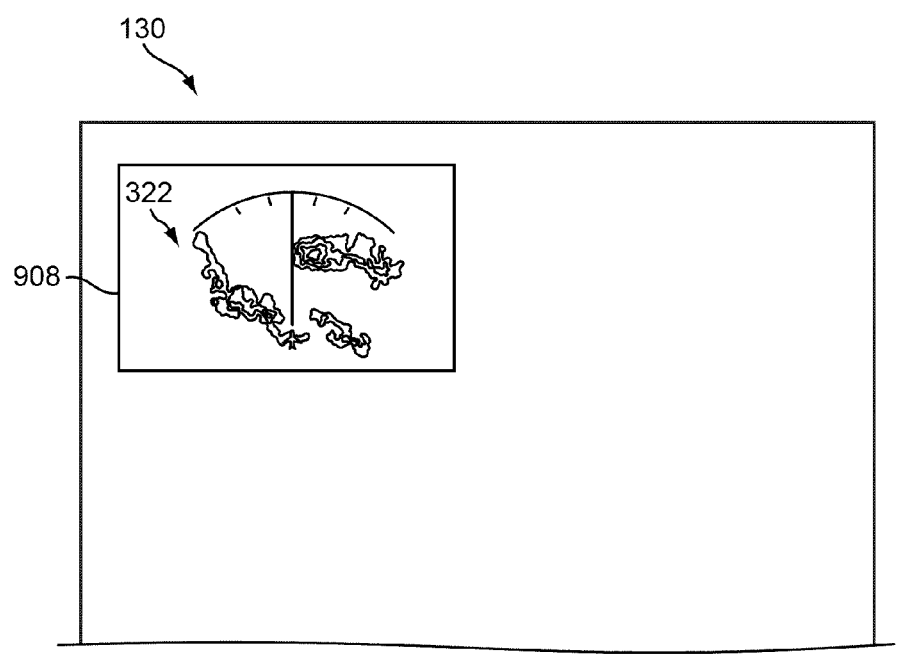

In FIGS. 11A-B, predefined locations 904, 906 are shown as the same size, and when the swap occurs in FIG. 11B, the size of weather radar 322 and checklist 318 are unchanged. In another embodiment, shown in FIG. 11C, when the user selects weather radar 322, touchscreen 130 may display, for example, predefined locations 908, 910, 912, 914 instead of or in addition to predefined locations 902, 904, 906. If a user were to then select predefined location 912 or 914 for weather radar 322, then weather radar 322 may be resized before being rendered in predefined location 908, 910, 912, or 914, to adjust for the change in location size. In particular, if the user selects one of predefined locations 908, 910, which are sections within predefined location 904, this may allow a user to resize weather radar 322 within its current predefined location 904. In yet another embodiment, a user may be able to resize weather radar 322 without the use of the displays of the available predefined locations. For example, if a user provides a user input on a corner of the display, the user may then be able to drag his or her finger to resize weather radar 322 to a desired size. Upon receiving such user input, touchscreen 130 may be configured to resize weather radar 322 based on the user input and on general constraints to the display. Referring to FIG. 11D, the result of a user selecting a new predefined location 908 for weather radar is shown. Weather radar 322 is scaled to fit the new predefined location 908. As another example, the user, instead of shrinking weather radar 322, may use the same or similar input technique to increase the size of weather radar 322 to, for example, make weather radar 322 full screen instead of half-screen.

In another embodiment, had the user chosen predefined location 902 (the full screen option) for weather radar 322, then weather radar 322 may be displayed in the entirety of top portion 922, and checklist 318 may be removed from the display entirely. In yet another embodiment, the user may have the option to select weather radar 322 and remove it from the display entirely. For example, if the user "drags" weather radar 322 not to another predefined location but "off the screen" (e.g., off to the side or the edge of touchscreen 130), touchscreen 130 may interpret the user input as a remove function and remove weather radar 322 from the display.

In yet other embodiments, in order to execute the methods illustrated in FIGS. 11A-D, other touchscreen 130 inputs may be utilized other than a "drag and drop" method. For example, the user may tap touchscreen 130 to select data, e.g., weather radar 322. The user may then tap touchscreen 130 again to select a new location for weather radar 322, and the swap, repositioning, resizing, or removal of the various data being shown may be executed. In another embodiment, tapping weather radar 322 twice may result in the removal of weather radar 322, or any other type of user input may be used to execute different functions. The user inputs may be managed as described above with reference to user interface module 528 of FIG. 5.

Figure 11E:
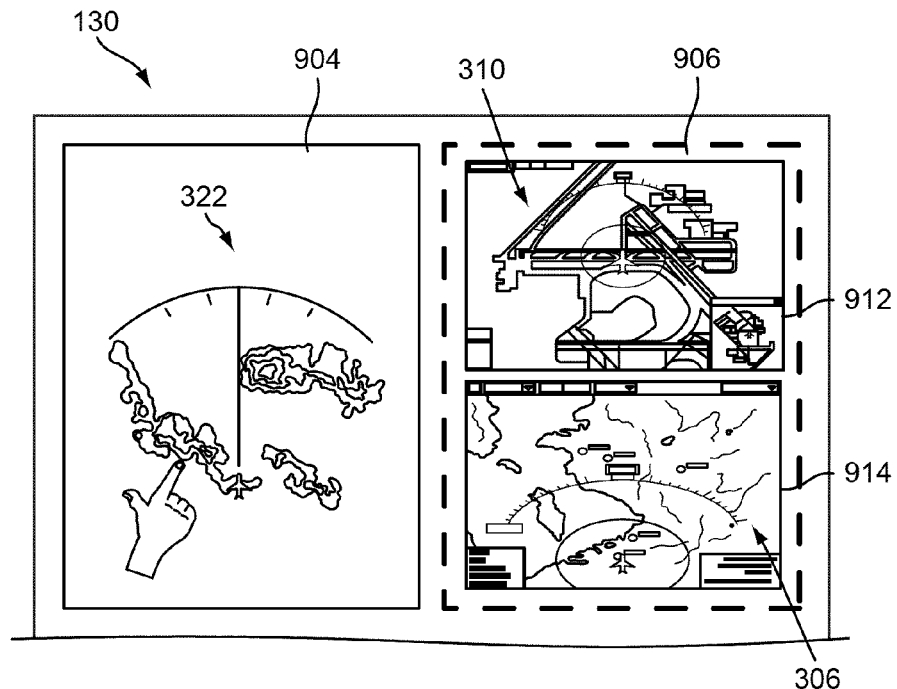
Figure 11F:
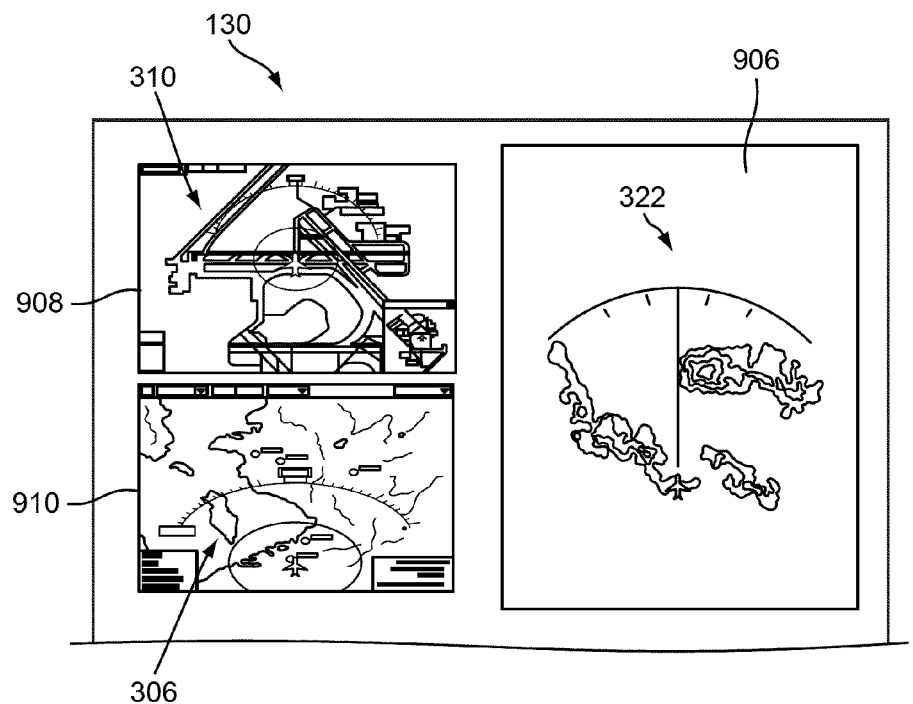

The functionality described in FIGS. 11A-D may be used to swap more than two windows of data, according to one embodiment. Referring now to FIG. 11E, touchscreen 130, in top portion 922, includes a first location 904 (showing weather radar 322), second location 912 (showing airport map 310), and third location 914 (showing topological map 306) displaying three different sets of data. If a user selects data in first location 904 and moves it to a predefined location 906, then the data in second location 912 and third location 914 may move together to occupy a location 908 and 910 that are regions within the former first location 904, as shown in FIG. 11F. The functionality described in FIGS. 11A-F may switch between regions on the same display or may switch between regions on different displays (e.g., left PFD 222*a* and right PFD 222*b*).

Figure 12A:
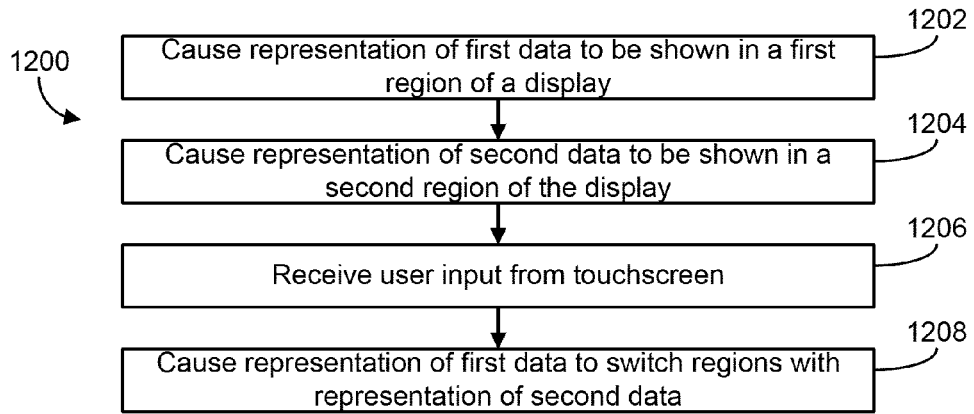
FIG. 12A is a schematic flow chart of a process of swapping data in an aviation display, according to an exemplary embodiment.

Referring now to FIG. 12A, a flow chart of a process 1200 of swapping data in an aviation display is shown, according to an exemplary embodiment. Process 1200 includes causing a representation of first data to be shown in a first region of a display (step 1202) and causing a representation of second data to be shown in a second region of a display (step 1204). For example, referring also to FIGS. 11A-B, steps 1202-1204 may include generating a representation of weather radar 322 and checklist 318.

Process 1200 further includes receiving a user input from the touchscreen (step 1206). The user input may relate to a selection of either the first data or second data and a new predefined location (e.g., region) to display the first data or second data. For example, step 1206 may include the selection of weather radar 322 as shown in FIG. 11A and the selection of a predefined location 906 to move weather radar 322. Process 1200 further includes causing a representation of first data to switch regions with the representation of the second data (step 1208). Step 1208 may include, for example, the switching of data as illustrated in FIG. 11B.

Figure 12B:
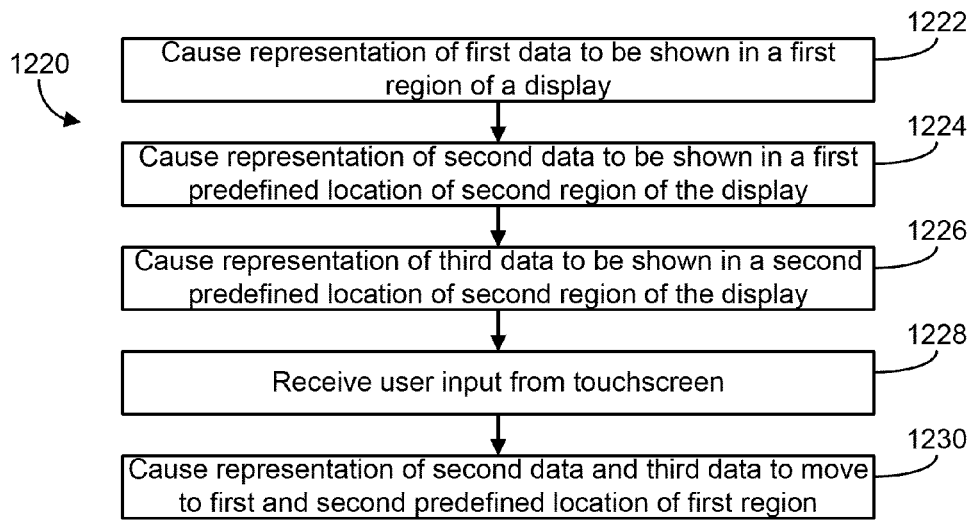
FIG. 12B is a schematic flow chart of a process of swapping data in an aviation display, according to another exemplary embodiment.

Referring now to FIG. 12B, a flow chart of a process 1220 of swapping data in an aviation display is shown, according to another exemplary embodiment. Process 1220 includes causing a representation of first data to be shown in a first region of a display (step 1222). Process 1220 further includes causing a representation of second data to be shown in a first predefined location of a second region of the display (step 1224) and a representation of third data to be shown in a second predefined location of the second region of the display (step 1226). For example, referring also to FIG. 11E, steps 1222-1226 may include the steps of displaying weather radar 322, airport map 310, and topological map 306 in locations 904, 912, and 914, respectively.

Process 1220 further includes receiving a user input from the touchscreen (step 1228). The user input may relate to a selection of one of the first data, second data, or third data, and a new predefined location (e.g., region) to display the data. For example, referring to FIG. 11E, step 1228 may include the selection of weather radar 322 and a predefined location 906. As another example, step 1228 may include the selection of airport map 310 and a predefined location 904.

Process 1220 further includes causing a representation of the second data and third data to move to a first and second predefined location of the first region (step 1230). For example, referring to FIGS. 11E-F, if the user input relates to a movement of weather radar 322 to location 906, then step 1230 may include moving airport map 310 to predefined location 908 and topological map 306 to predefined location 910.

Figure 12C:
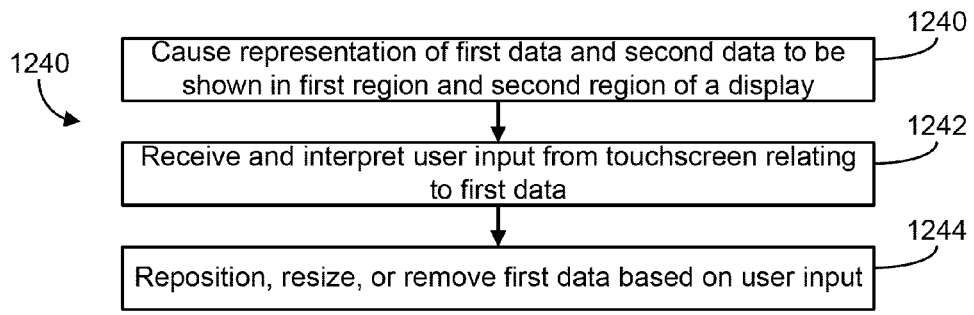
FIG. 12C is a schematic flow chart of a process of manipulating data in an aviation display, according to an exemplary embodiment.

Referring now to FIG. 12C, a flow chart of a process 1240 of manipulating data in an aviation display is shown, according to an exemplary embodiment. Process 1240 includes causing a representation of first data and second data to be shown in a first region and second region of the display (step 1240), which may be substantially similar to steps 1202-1204 and 1222-1224 as described above.

Process 1240 further includes receiving and interpreting a user input from the touchscreen relating to the first data (step 1242). The user input may relate to one or more of many functions related to the first data. For example, the user input may relate to a repositioning of the first data to another area of the display. As another example, the user input may relate to a resizing of the first data within a portion of the display. As yet another example, the user input may relate to the removal of the first data from the display. Process 1240 then includes repositioning, resizing, or removing the first data based on the user input (step 1244).

Using the methods described in FIGS. 11-12, a user of touchscreen 130 may be able to manipulate the display without having to select icons or avatars one-by-one. Instead, the user may select multiple icons or avatars to provide a display of the various data, and then manipulate the display of the data by resizing, swapping, moving, or removing the data using various hand gestures or other input functionality.

Referring back to FIG. 10B, display region management module 1022 may be configured to manage the display during the various manipulation steps. For example, when a user selects data to be swapped, module 1022 may determine possible resizing options, possible predefined locations the data may move to, or the like. Further, icon/avatar selection module 1020 may be configured to provide a representation of the data for use during the manipulation steps. For example, module 1020 may be configured to, for a "drag and drop" configuration, generate a static image of the data, representative of the full format representation of the data. This static image may be displayed while the user drags the image, resizes the image, or otherwise manipulates the image.

Figure 13:
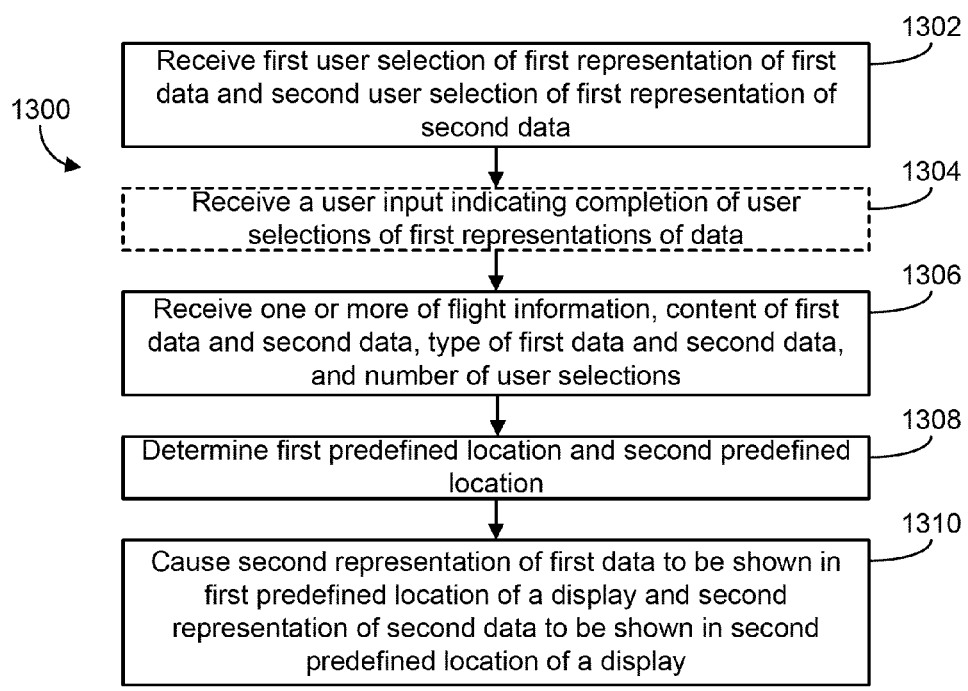
FIG. 13 is a schematic flow chart of a process for automatically determining the size and position of data in an aviation display, according to an exemplary embodiment.

Referring now to FIG. 13, a flow chart of a process 1300 for automatically determining the size and position of data in an aviation display is shown, according to an exemplary embodiment. Referring generally to FIGS. 9-12, various systems and methods for receiving a user input relating to the display and manipulation of data in an aviation display are described. In the embodiment described in FIG. 13, the arrangement and presentation of the data (e.g., the location of the data in the display, the size, formatting, etc.) may be partially or wholly automated by processing electronics 404 instead of using a user input. For a user of touchscreen 130, this may allow the user to simply select more than one icons or avatars, and have the representations on the display be automatically configured and arranged, reducing the workload of the user (e.g., if the user is the pilot of the aircraft, the pilot may make icon and avatar selections without the need to manipulate the data after selection). The user may select the multiple icons and avatars, one after the other, when desired, instead of selecting icons and avatars in series, e.g., selecting one at a time, formatting the data or waiting for the display to be ready, then selecting another. When the user is finished selecting icons and avatars, an optimal display arrangement and configuration may be determined and then provided to the user.

Further, by using the automated process, the formatting of the data may be optimized. For example, if two icons are chosen by a user, the data corresponding to the two icons may be automatically displayed in a half-screen format on each half of the display. As another example, if an emergency occurs, data about the emergency may be formatted to a full screen format instead of a half-screen or quarter-screen format. In other words, data other than user input may be used to determine a format of the data on the display.

Process 1300 includes receiving a first user selection of a first representation of first data and a second user selection of a first representation of second data (step 1302). For example, step 1302 may include receiving a user selection plurality of icons or avatars without selecting a preferred predefined location for each icon or avatar to launch into. Process 1300 may include receiving a user input indicating completion of user selection of first representations of data (step 1304). For example, step 1304 may include double-tapping the screen, dragging the group of selections to the upper region 922 of the display, "flicking" the group of selections to the upper region 922 of the display, etc. to indicate that there will be no more users selections of first representations of data and that the processing electronics 404 may proceed to the next step. According to another embodiment, processing electronics 404 may interpret no additional user selections in a predetermined period of time as a user input indicating no more user selections of first representations of data.

In one embodiment, a user may be able to select multiple icons or avatars at step 1302. After finishing selection of all the icons or avatars the user wishes to select, the user may make a single "drag and drop" or "flicking" motion towards the display portion of the touchscreen, e.g., moving all icons and avatars at once (step 1304). When the user finishes the drag and drop motion, then steps 1306, 1308 may be executed in which the optimal display of the selected data is determined.

In order to help determine an optimal way to display the data associated with the icons or avatars, process 1300 may include receiving information such as flight information, the content of the first data and second data, the type of the first data and second data, and the number of user selections (step 1306). Flight information may relate to the current status of the aircraft (e.g., phase of flight (takeoff, climb, cruise, descent, landing, taxiing, etc.), auto-pilot or manual control, etc.), navigational information, diagnostic information, or any other information related to the current operation of the aircraft. The content of the first data and second data may be the raw data that is to be displayed or an analysis of the data. The type of the first data and second data may indicate the application (weather, checklist, diagnostics, etc.) in which the data is processed or displayed. The number of user selections may relate to the number of icons or avatars selected by the user. While process 1300 describes a method for data display based on two user inputs, in other embodiments, process 1300 may be extended to include more than two such user inputs, or just one user input, without departing from the scope of the present disclosure.

Process 1300 further includes determining a first predefined location and second predefined location (step 1308) to display the first data and second data. For example, for two user selections, if there is no flight information or data that indicates a special condition, step 1308 may generally include determining that the first data and second data should each take up half of the display. As another example, if the aircraft is approaching rough or rapidly developing weather and one of the user inputs relates to a weather radar, step 1308 may include determining that the weather radar is critical and determining a larger or more prominent first predefined location for the weather radar. As yet another example, if the type of the first data is textual data and the type of the second data is a map, step 1308 may include determining the amount of space needed to display the map and determining a font size of the text needed in order for a user to be able to read the text. As yet another example, if the aircraft is landing, an airport map may be accentuated compared to other data. As yet another example, a checklist relating to a phase of flight or a particular warning may be accentuated if the aircraft is in that particular phase of flight or annunciated the warning or malfunction indication. Step 1308 may include any number of logical steps to determine an optimal display of the various data selected by the user.

Process 1300 further includes causing a second representation of the first data to be shown in the first predefined location of the display, and the second representation of the second data to be shown in the second predefined location of the display (step 1310). Step 1310 may generally include the displaying of the data associated with the multiple user selections.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus for controlling an aviation display comprising:
   processing electronics configured:
      to cause a first representation of a first aviation data to be shown in a first format of the first aviation data, and to cause, in response to a first user input relative in relation to the first format, a second representation of the first aviation data to be shown in a second format of the first aviation data, the second format of the first aviation data comprising a first predefined location on a first region of a display;
      to cause a first representation of second aviation data to be shown in a first format of the second aviation data, and to cause, in response to a first user input in relation to the first format of the second aviation data, a second representation of the second aviation data to be shown in a second format of the second aviation data comprising a second predefined location on the first region of the display; and
      to cause a first representation of third aviation data to be shown in a first format of the third aviation data, and to cause, in response to a first user input in relation to the first format of the third aviation data, a second representation of the third aviation data to be shown in a third format, the third format comprising a third predefined location comprising about one-fourth of the first region of the display.

2. The apparatus of claim 1, wherein the first predefined location is one of a plurality of possible predefined locations, and wherein the processing electronics are further configured to cause a graphical annunciation of the possible predefined locations in response to at least a portion of the first user input.

3. The apparatus of claim 1, wherein the processing electronics are configured to cause the first format of the first aviation data, the first format of the second aviation data, and the first format of the third aviation data to be shown on a second region of the display.

4. The apparatus of claim 1, wherein the first user input comprises dragging the first representation onto the first predefined location, and wherein the processing electronics are configured to cause the first aviation data to reside in the first predefined location in response to dropping the first representation in the first predefined location.

5. The apparatus of claim 1, wherein the size of the predefined location is dependent on the type of aviation data corresponding to the first format.

6. The apparatus of claim 1, wherein the processing electronics are configured to cause the second representation of the first aviation data and the second representation of the second aviation data to switch locations in response to a second user input.

7. The apparatus of claim 1, wherein the first predefined location and the second predefined location each comprise substantially half of the first region of the display.

8. The apparatus of claim 7, wherein the processing electronics are further configured to cause, in response to a second user input in relation to the second format of the first aviation data, a second representation of the first aviation data to be shown in a format comprising the entire first region of the display.

9. An apparatus for controlling an aviation display comprising:
   processing electronics configured:
      to cause a representation of a first aviation data to be shown in a first region of a display, to cause a representation of a second aviation data to be shown in a second region of the display, and to cause, in response to receiving a first user input from a touchscreen, the representation of the first aviation data to switch regions with the representation of the second aviation data; and
      to cause the representation of the second aviation data to be shown in a first predefined location in the second region of the display, and to cause a representation of a third aviation data to be shown in a second predefined location in the second region of the display, and wherein the representation of the second aviation data and the representation of a third aviation data to move to a first predefined location of the first region of the display and a second predefined location of the first region of the display, respectively, in response to the first user input.

10. The apparatus of claim 9, wherein the first user input comprises a gesture in relation to the representation of the first aviation data.

11. The apparatus of claim 9, wherein a second user input causes the representation of the first aviation data to change size.

12. The apparatus of claim 11, wherein the second user input causes the representation of the first aviation data occupy substantially all of the first region and the second region of the display.

13. An apparatus for controlling an aviation display comprising:
  processing electronics configured:
    to receive a first user selection of a first representation of a first aviation data, a second user selection of a first representation of a second aviation data, and a third user selection of a first representation of a third aviation data; and
    to cause, in response to receiving the first user selection, the second user selection, and the third user selection, a second representation of the first aviation data to be shown in a first predefined location of a display, a second representation of the second aviation data to be shown in a second predefined location of the display, and a second representation of the third aviation data to be shown in a third predefined location of the display;
    wherein the third predefined location comprises about one-fourth of the display.

14. The apparatus of claim 13, wherein the processing electronics are configured to receive a phase of flight information and to determine the location of at least one of the second representation of the first aviation data and the second representation of the second aviation data based on the phase of flight information.

15. The apparatus of claim 13, wherein the processing electronics are configured to determine the location of at least one of the second representation of the first aviation data and the second representation of the second aviation data based on the content of the first aviation data and the second aviation data.

16. The apparatus of claim 13, wherein the processing electronics are configured to determine the location of at least one of the second representation of the first aviation data and the second representation of the second aviation data based on the type of the first aviation data and the second aviation data.

17. The apparatus of claim 13, wherein the first representation of the first aviation data and the second user selection of the first representation of a second aviation data are two of a plurality of first representations of aviation data, and wherein the processing electronics are configured to determine the location of at least one of the second representation of the first aviation data and the second representation of the second aviation data based on the number of first representations of aviation data selected.

18. The apparatus of claim 13, wherein the first predefined location is in a first region of a display, the second predefined location is in a second region of the display, and the third predefined location is in the second region of the display; and
  the processing electronics are further configured to cause, in response to receiving a first user input, the second representation of the first aviation data to switch regions of the display with the second representations of the second aviation data and third aviation data such that the second representation of the first aviation data is shown in a first predefined location in the second region of the display, the second representation of the second aviation data is shown in a second predefined location in the first region of the display, and the second representation of the third aviation data is shown in a third predefined location in the first region of the display.

19. The apparatus of claim 1, wherein:
  the first predefined location is in a first sub-region of a display, the second predefined location is in a second sub-region of the display, and the third predefined location is in the second sub-region of the display; and
  the processing electronics are further configured to cause, in response to receiving a second user input, the second representation of the first aviation data to switch sub-regions of the display with the second representations of the second aviation data and third aviation data such that the second representation of the first aviation data is shown in a first predefined location in the second sub-region of the display, the second representation of the second aviation data is shown in a second predefined location in the first sub-region of the display, and the second representation of the third aviation data is shown in a third predefined location in the first sub-region of the display.

20. The apparatus of claim 9, wherein:
  the representation of the first aviation data is shown in a second format in response to a touchscreen gesture in relation to a first format representation of the first aviation data;
  the representation of second aviation data is shown in a third format in response to a touchscreen gesture in relation to a first format representation of the second aviation data;
  the representation of third aviation data is shown in a fourth format in response to a touchscreen gesture in relation to a first format representation of the third aviation data; and
  the first region and the second region are located in a first area of the display, and the fourth format comprises about one-fourth of the first area of the display.

21. The apparatus of claim 20, wherein the fourth format is substantially the same size as the third format.

* * * * *